(12) United States Patent
Tanabe et al.

(10) Patent No.: US 10,901,255 B2
(45) Date of Patent: Jan. 26, 2021

(54) LIQUID CRYSTAL DISPLAY DEVICE

(71) Applicant: SEMICONDUCTOR ENERGY LABORATORY CO., LTD., Atsugi (JP)

(72) Inventors: Toru Tanabe, Tokyo (JP); Takahiro Fukutome, Tochigi (JP); Koji Moriya, Kanagawa (JP); Daisuke Kurosaki, Tochigi (JP); Masakatsu Ohno, Tochigi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 159 days.

(21) Appl. No.: 15/890,404

(22) Filed: Feb. 7, 2018

(65) Prior Publication Data
US 2018/0164625 A1 Jun. 14, 2018

Related U.S. Application Data

(63) Continuation of application No. 15/433,539, filed on Feb. 15, 2017, now Pat. No. 10,317,717, which is a
(Continued)

(30) Foreign Application Priority Data
Mar. 22, 2013 (JP) .................................. 2013-059637

(51) Int. Cl.
*G02F 1/1333* (2006.01)
*G06F 3/041* (2006.01)
(Continued)

(52) U.S. Cl.
CPC .......... *G02F 1/13338* (2013.01); *G02F 1/137* (2013.01); *G02F 1/1337* (2013.01);
(Continued)

(58) Field of Classification Search
None
See application file for complete search history.

(56) References Cited

U.S. PATENT DOCUMENTS 5,892,562 A * 4/1999 Yamazaki ......... G02F 1/134363
349/141
6,914,656 B2 7/2005 Sakamoto et al.
(Continued)

FOREIGN PATENT DOCUMENTS

CN 101126849 A 2/2008
CN 102841466 A 12/2012
(Continued)

OTHER PUBLICATIONS

Taiwanese Office Action (Application No. 103107693) dated Aug. 31, 2017.
(Continued)

*Primary Examiner* — Ryan Crockett
(74) *Attorney, Agent, or Firm* — Nixon Peabody LLP; Jeffrey L. Costellia

(57) ABSTRACT

A liquid crystal display device that is not influenced by a noise in obtaining positional information can be provided. The liquid crystal display device includes a first substrate provided with a pixel electrode and a common electrode with a first insulating film interposed therebetween. The pixel electrode and the common electrode partly overlap with each other. The liquid crystal display device further includes a second substrate provided with a pair of electrodes, a resin film covering the pair of electrodes, and a conductive film on the resin film. The pair of electrodes partly overlap with each other with a second insulating film interposed therebetween. The liquid crystal display device further includes a liquid crystal layer between the conductive film on the second substrate side and the pixel electrode
(Continued)

and the common electrode on the first substrate side. A predetermined potential is supplied to the conductive film.

16 Claims, 14 Drawing Sheets

Related U.S. Application Data continuation of application No. 14/217,578, filed on Mar. 18, 2014, now Pat. No. 9,581,849.

(51) Int. Cl.
*G02F 1/1337* (2006.01)
*G02F 1/1343* (2006.01)
*G02F 1/1368* (2006.01)
*G02F 1/137* (2006.01)
*G06F 3/044* (2006.01)

(52) U.S. Cl.
CPC ...... *G02F 1/1368* (2013.01); *G02F 1/133345* (2013.01); *G02F 1/134309* (2013.01); *G06F 3/0412* (2013.01); *G06F 3/0446* (2019.05); *G02F 2001/133334* (2013.01); *G02F 2201/121* (2013.01); *G02F 2201/123* (2013.01); *G06F 2203/04103* (2013.01)

(56) References Cited

U.S. PATENT DOCUMENTS

| | | | |
|---|---|---|---|
| 7,859,632 B2 | 12/2010 | Kim et al. | |
| 7,894,010 B2 | 2/2011 | Yu et al. | |
| 8,009,254 B2 | 8/2011 | Kobayashi et al. | |
| 8,013,943 B2* | 9/2011 | Tanaka | G06F 3/044 345/174 |
| 8,179,485 B2 | 5/2012 | Tsai et al. | |
| 8,243,027 B2 | 8/2012 | Hotelling et al. | |
| 8,259,078 B2 | 9/2012 | Hotelling et al. | |
| 8,432,371 B2 | 4/2013 | Hotelling et al. | |
| 8,451,244 B2 | 5/2013 | Hotelling et al. | |
| 8,471,828 B2* | 6/2013 | Liu | G02F 1/13338 345/174 |
| 8,493,536 B2 | 7/2013 | Kobayashi et al. | |
| 8,547,488 B2 | 10/2013 | Kim et al. | |
| 8,552,989 B2 | 10/2013 | Hotelling et al. | |
| 8,553,191 B2 | 10/2013 | Nagami | |
| 8,581,819 B2 | 11/2013 | Choi | |
| 8,654,083 B2 | 2/2014 | Hotelling et al. | |
| 8,907,922 B2 | 12/2014 | Liu | |
| 9,019,456 B2 | 4/2015 | Liu | |
| 9,069,401 B2 | 6/2015 | Utsunomiya et al. | |
| 9,217,909 B2 | 12/2015 | Zhao | |
| 9,218,081 B2* | 12/2015 | Yamazaki | G06F 3/3265 |
| 9,244,561 B2 | 1/2016 | Hotelling et al. | |
| 9,268,429 B2 | 2/2016 | Hotelling et al. | |
| 9,368,075 B2 | 6/2016 | Lee et al. | |
| 9,405,330 B2 | 8/2016 | Yamagishi et al. | |
| 9,417,486 B2 | 8/2016 | Murata et al. | |
| 9,442,608 B2 | 9/2016 | Ishizaki et al. | |
| 9,470,941 B2* | 10/2016 | Park | G02F 1/13338 |
| 9,575,610 B2 | 2/2017 | Hotelling et al. | |
| 9,581,849 B2 | 2/2017 | Tanabe et al. | |
| 9,891,458 B2 | 2/2018 | Utsunomiya et al. | |
| 10,156,948 B2 | 12/2018 | Ishizaki et al. | |
| 10,317,717 B2 | 6/2019 | Tanabe et al. | |
| 2005/0219446 A1 | 10/2005 | Hisatake | |
| 2006/0250566 A1 | 11/2006 | Kim et al. | |
| 2007/0146591 A1 | 6/2007 | Kimura et al. | |
| 2008/0167526 A1 | 7/2008 | Crank et al. | |
| 2008/0169997 A1 | 7/2008 | Choi | |
| 2008/0180407 A1* | 7/2008 | Utsunomiya | G06F 3/0412 345/174 |
| 2009/0046077 A1 | 2/2009 | Tanaka et al. | |
| 2009/0059106 A1 | 3/2009 | Kitadani et al. | |
| 2009/0061115 A1 | 3/2009 | Wang et al. | |
| 2009/0122021 A1* | 5/2009 | Liu | G02F 1/13338 345/173 |
| 2009/0180069 A1* | 7/2009 | Nishimura | G02F 1/1343 349/139 |
| 2009/0190077 A1 | 7/2009 | Lee | |
| 2010/0091231 A1* | 4/2010 | Nishimura | G02F 1/134363 349/139 |
| 2010/0182273 A1 | 7/2010 | Noguchi et al. | |
| 2010/0315374 A1* | 12/2010 | Chen | G06F 3/044 345/174 |
| 2011/0157762 A1* | 6/2011 | Kurashima | G06F 3/044 361/277 |
| 2011/0242469 A1* | 10/2011 | Kawamura | G02F 1/133512 349/138 |
| 2012/0223308 A1* | 9/2012 | Okabe | G02F 1/1368 257/43 |
| 2012/0242923 A1* | 9/2012 | Miyamoto | G02F 1/136227 349/43 |
| 2012/0249452 A1* | 10/2012 | Kitano | G06F 1/1656 345/173 |
| 2012/0327321 A1* | 12/2012 | Huang | G02F 1/1362 349/42 |
| 2013/0010216 A1* | 1/2013 | Kang | G06F 3/0412 349/12 |
| 2013/0050628 A1* | 2/2013 | Takano | G02F 1/13338 349/143 |
| 2013/0120684 A1* | 5/2013 | Sato | G02F 1/136204 349/46 |
| 2013/0307565 A1* | 11/2013 | Ra | G06F 3/044 324/649 |
| 2014/0055685 A1* | 2/2014 | Wang | G06F 3/0412 349/12 |
| 2014/0152922 A1 | 6/2014 | Bae et al. | |
| 2014/0240617 A1* | 8/2014 | Fukutome | G02F 1/13338 349/12 |
| 2014/0375910 A1* | 12/2014 | Tada | G06F 3/044 349/12 |
| 2015/0085224 A1 | 3/2015 | Hsu et al. | |
| 2015/0153620 A1 | 6/2015 | Iwata et al. | |
| 2015/0177571 A1 | 6/2015 | Yoshida et al. | |
| 2015/0277174 A1 | 10/2015 | Utsunomiya et al. | |
| 2015/0325187 A1 | 11/2015 | Tanaka et al. | |
| 2016/0026026 A1 | 1/2016 | Kim et al. | |
| 2016/0117033 A1 | 4/2016 | Yamazaki et al. | |
| 2016/0291371 A1 | 10/2016 | Utsunomiya et al. | |
| 2017/0147119 A1* | 5/2017 | Hotelling | G09G 3/3648 |
| 2018/0143476 A1 | 5/2018 | Utsunomiya et al. | |
| 2019/0064971 A1 | 2/2019 | Ishizaki et al. | |

FOREIGN PATENT DOCUMENTS

| | | |
|---|---|---|
| CN | 102981672 A | 3/2013 |
| EP | 1953626 A | 8/2008 |
| EP | 2259172 A | 12/2010 |
| EP | 2330491 A | 6/2011 |
| EP | 2330492 A | 6/2011 |
| EP | 2330493 A | 6/2011 |
| EP | 2330494 A | 6/2011 |
| EP | 3264240 A | 1/2018 |
| JP | 2008-185785 A | 8/2008 |
| JP | 2009-244958 A | 10/2009 |
| JP | 3154829 | 10/2009 |
| JP | 2009-540374 | 11/2009 |
| JP | 2010-175940 A | 8/2010 |
| JP | 2010-191287 A | 9/2010 |
| JP | 2011-248356 A | 12/2011 |
| JP | 2012-113090 A | 6/2012 |
| JP | 2012-220670 A | 11/2012 |
| JP | 6503157 | 4/2019 |
| KR | 2008-0071489 A | 8/2008 |
| TW | 200841071 | 10/2008 |
| TW | 200949649 | 12/2009 |
| TW | 201044244 | 12/2010 |
| TW | 201222357 | 6/2012 |
| TW | M440479 | 11/2012 |
| TW | M442547 | 12/2012 |

(56) References Cited

FOREIGN PATENT DOCUMENTS

| | | |
|---|---|---|
| TW | 201312434 | 3/2013 |
| WO | WO-2007/102238 | 9/2007 |
| WO | WO-2007/146779 | 12/2007 |
| WO | WO-2007/146780 | 12/2007 |
| WO | WO-2007/146783 | 12/2007 |
| WO | WO-2007/146785 | 12/2007 |
| WO | WO-2011/135988 | 11/2011 |
| WO | WO-2013/028538 | 2/2013 |

OTHER PUBLICATIONS

Office Action for U.S. Appl. No. 15/433,539, dated Mar. 8, 2018.
Taiwanese Office Action (Application No. 107103664) dated Oct. 28, 2020.

* cited by examiner

LIQUID CRYSTAL DISPLAY DEVICE

BACKGROUND OF THE INVENTION

1. Field of the Invention

The present invention relates to liquid crystal display devices. In particular, the present invention relates to liquid crystal display devices having a touch panel function.

2. Description of the Related Art

A touch panel functions as a position input device that can detect a position indicated with a finger, a stylus, or the like to generate a signal including the positional information. A capacitive touch panel can obtain positional information without being influenced by external light, unlike an optical touch panel such as an infrared touch panel. Furthermore, the capacitive touch panel can obtain the positional information at high speed as compared with a resistive touch panel and does not cause physical wear of electrodes. For these reasons, capacitive touch panels have come into wide use in the market in recent years.

In addition, as the kinds of liquid crystal display devices including a touch panel, there are an in-cell liquid crystal display device in which part of a touch panel function is provided inside a liquid crystal panel and an on-cell liquid crystal display device in which a touch panel is provided between a polarizing plate and a liquid crystal panel. The in-cell type is more advantageous than the on-cell type in manufacturing a thin and lightweight liquid crystal display device including a touch panel.

Patent Document 1 discloses an in-cell liquid crystal display device including a capacitive touch panel.

REFERENCE

Patent Document

[Patent Document 1] Japanese Published Patent Application No. 2009-244958

SUMMARY OF THE INVENTION

The alignment of liquid crystal is unlikely to be disordered when the cell gap is somewhat changed by a press in liquid crystal panels in which horizontal electric field is applied to liquid crystal such as a fringe field switching (FFS) liquid crystal panel, as compared to in liquid crystal panels in which vertical electric field is applied to liquid crystal such as a twisted nematic (TN) liquid crystal panel. Therefore, in the case where a horizontal electric field mode liquid crystal panel in which horizontal electric field is applied to liquid crystal is used in a liquid crystal display device including a touch panel, a press hardly influences display of images.

However, the horizontal electric field mode liquid crystal panel does not include an electrode on a counter substrate that faces an element substrate on which a transistor is provided. This makes it difficult to control the distribution of charges accumulated on the counter substrate. In some cases, many charges might be accumulated on part of the counter substrate by the influence of static electricity, and the accumulated charges make excessive electric field applied locally to liquid crystal, causing variations in luminance.

Furthermore, since the capacitive touch panel obtains positional information by sensing a slight change in capacitance between electrodes included in the touch panel or between these electrodes and a capacitive object such as a finger, a change in the potential of a signal that is necessary for operation of the liquid crystal panel might appear as a noise and adversely affect the obtainment of the positional information in the touch panel. In particular, in the in-cell liquid crystal display device including a touch panel, the distance between the element substrate on which a transistor is formed and a wiring or electrode of the touch panel is shorter than that in the on-cell liquid crystal display device including a touch panel and thus the parasitic capacitance generated between the wiring or electrode of the touch panel and a wiring or electrode included in the liquid crystal panel tends to be larger. Accordingly, the in-cell liquid crystal display device including a touch panel has a high possibility that a change in the potential of a signal that is necessary for operation of the liquid crystal panel appears as a noise and causes an adverse effect in obtaining positional information in the touch panel, as compared with the on-cell liquid crystal display device including a touch panel.

Moreover, the distance between the electrodes for obtaining the positional information and the conductive object such as a finger is longer in the in-cell liquid crystal display device including a touch panel than in the on-cell liquid crystal display device including a touch panel. Therefore, the in-cell liquid crystal display device including a touch panel has a lower sensitivity in obtaining positional information and a smaller signal-to-noise ration (SN ratio).

In view of the above-described technical background, an object of one embodiment of the present invention is to provide a liquid crystal display device including a touch panel and having small variations in luminance. Further, an object of one embodiment of the present invention is to provide a liquid crystal display device that is not influenced by a noise in obtaining positional information.

The liquid crystal display device of one embodiment of the present invention includes, on the first substrate side, a pixel electrode and a common electrode which partly overlap with each other with an insulating film interposed therebetween. In addition, the liquid crystal display device of one embodiment of the present invention includes, on the second substrate side, a pair of electrodes partly overlapping with each other with an insulating film interposed therebetween, a resin film covering the pair of electrodes, and a conductive film on the resin film. Furthermore, the pixel electrode and the common electrode on the first substrate side face the conductive film on the second substrate side, and a liquid crystal layer is provided between the first substrate and the second substrate.

The pair of electrodes and the conductive film positioned on the second substrate side are made of conductive materials having a light-transmitting property with respect to visible light. The visible light having passed through the second substrate passes through the pair of electrodes and the conductive film and then enters the liquid crystal layer.

A predetermined potential is applied to the conductive film positioned on the second substrate side. For example, the conductive film positioned on the second substrate side may be electrically connected to the common film positioned on the first substrate side; in this case, the same potential is applied to the conductive film and the common electrode.

In one embodiment of the present invention, the pair of electrodes is positioned on the second substrate side, and charges accumulated on the second substrate can be discharged through one of the pair of electrodes. This prevents accumulation of charges on part of the second substrate, thereby preventing local application of voltage to the liquid crystal layer. Thus variations in luminance can be prevented.

In one embodiment of the present invention, since the conductive film exists between the pixel electrode and the common electrode positioned on the first substrate side and the pair of electrodes positioned on the second substrate side, a parasitic capacitance is generated between the pixel electrode or the common electrode and the conductive film, and another parasitic capacitance is generated between the pair of electrodes and the conductive film. By application of a predetermined potential to the conductive film in the state where the parasitic capacitances are generated as described above, a change in the potential of the pair of electrodes can be prevented even when the potential applied to the pixel electrode is changed. In addition, a change in the potential of the pixel electrode or the common electrode can be prevented even when the potential of the pair of electrodes is changed at the time of obtaining positional information. Thus, in the in-cell liquid crystal display device of one embodiment of the present invention, a change in the potential of a signal that is necessary for operation of the liquid crystal panel is prevented from appearing as a noise and causing an adverse effect in obtaining positional information in the touch panel.

With one embodiment of the present invention, a liquid crystal display device including a touch panel and having small variations in luminance, can be provided. Further, with one embodiment of the present invention, a liquid crystal display device that is not influenced by a noise in obtaining positional information can be provided.

DETAILED DESCRIPTION OF THE INVENTION

Embodiment of the present invention will be described below in detail with reference to the drawings. Note that the present invention is not limited to the following description, and it is easily understood by those skilled in the art that the mode and details can be variously changed without departing from the spirit and scope of the present invention. Therefore, the present invention should not be construed as being limited to the description of the embodiments below.

Note that in this specification, the category of a liquid crystal display device includes a panel in which liquid crystal elements are formed in respective pixels, and a module in which an IC or the like including a driver circuit or a controller is mounted on the panel.

Example of Stacked Structure of Pixel in Liquid Crystal Display Device

Figure 1:
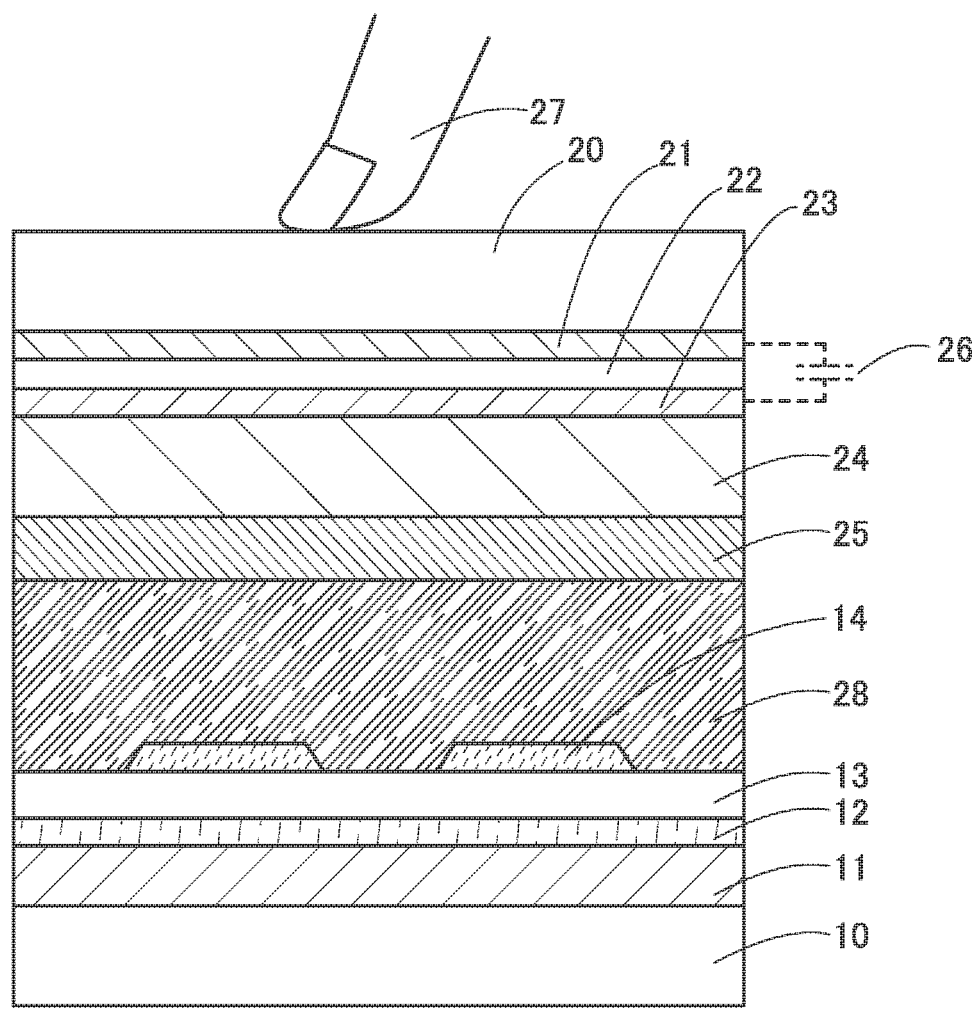
FIG. 1 illustrates a structure of a liquid crystal display device.

FIG. 1 illustrates an example of a stacked structure of a pixel in a liquid crystal display device of one embodiment of the present invention.

The liquid crystal display device of one embodiment of the present invention includes, on the first substrate 10 side, an element layer 11 including a semiconductor element such as a transistor, a wiring, and the like, an electrode 12 over the element layer 11, an insulating film 13 over the electrode 12, and an electrode 14 positioned over the insulating film 13 and partly overlapping with the electrode 12. One of the electrode 12 and the electrode 14 corresponds to a pixel electrode whose potential is controlled with an image signal, and the other corresponds to a common electrode to which a predetermined potential is applied regardless of the image signal.

Furthermore, the liquid crystal display device of one embodiment of the present invention includes, on the second substrate 20 side, a first electrode 21 and a second electrode 23 that partly overlap with each other, an insulating film 22 between the first electrode 21 and the second electrode 23, a resin film 24 covering the first electrode 21 and the second electrode 23, and a conductive film 25 on the resin film 24.

Further, the electrode 12 and the electrode 14 on the first substrate 10 side and the conductive film 25 on the second substrate 20 side face each other. In addition, between the first substrate 10 and the second substrate 20, a liquid crystal layer 28 including a liquid crystal material is provided between the electrodes 12 and 14 and the conducive film 25. The electrode 12, the electrode 14, and the liquid crystal layer 28 to which an electric field is applied from the electrodes 12 and 14 constitute a liquid crystal element. The alignment of the liquid crystal material in the liquid crystal layer 28, that is, the transmittance of the crystal layer 28, is changed by application of the electric field to the liquid crystal layer 28.

The resin film 24 has a function of preventing the flatness of the conductive film 25 from being lost owing to the shape of the first electrode 21 and the second electrode 23. In other words, even when the first electrode 21 and the second electrode 23 have roughness, the resin film 24 provided between the first and second electrodes 21 and 23 and the conductive film 25 allows the flatness of the source of the conductive film 25 to be higher than the flatness of the surfaces of the first and second electrodes 21 and 23. Although not shown in FIG. 1, an alignment film is provided on the insulating film 13 and the electrode 14 and another alignment film is provided on the conductive film 25. Accordingly, the resin film 24 can increase not only the flatness of the surface of the conductive film 25 but also the flatness of the alignment film on the conductive film 25.

When a conductive object 27 such as a finger comes close to or in contact with the second substrate 20, the capacitance of capacitors provided in the first electrode 21 and the second electrode 23 changes. By reading the change in capacitance, positional information of the conductive object 27 can be obtained. For example, the positional information can be read from the change in the capacitance of a capacitor 26 that is formed between the first electrode 21 and the second electrode 23. Alternatively, the positional information can be read from the change in the capacitance of a capacitor formed between the first and second electrodes 21 and 23 and the conductive object 27.

Further in the liquid crystal display device of one embodiment of the present invention, the second substrate 20 has a light-transmitting property with respect to visible light, and the first electrode 21, the second electrode 23, and the conductive film 25 positioned on the second substrate 20 side are formed of conductive materials having a light-transmitting property with respect to visible light. As the second substrate 20, a glass substrate or a resin substrate of plastic or the like can be used, for example. Examples of the conductive materials having a light-transmitting property are indium oxide containing tungsten oxide, indium zinc oxide containing tungsten oxide, indium oxide containing titanium oxide, indium tin oxide containing titanium oxide, indium tin oxide, indium zinc oxide, zinc oxide, zinc oxide to which gallium is added, and indium tin oxide to which silicon oxide is added.

The visible light having passed through the second substrate 20 passes through the first electrode 21, the second electrode 23, and the conductive film 25 and then enters the liquid crystal layer 28.

In one embodiment of the present invention, as described above, the first electrode 21 and the second electrode 23 that are used for obtaining positional information are positioned on the second substrate 20 side. With this structure, charges accumulated on the second substrate 20 can be discharged through one of the first electrode 21 and the second electrode 23. This prevents accumulation of charges on part of the second substrate 20, thereby preventing local application of voltage to the liquid crystal layer 28. Thus, variations in luminance can be prevented.

One semiconductor of the present invention is the in-cell liquid crystal display device in which the first electrode 21 and the second electrode 23 used for obtaining positional information are provided between the first substrate 10 and the second substrate 20. Even in the case of the in-cell liquid crystal display device, since the conductive film 25 exists between the electrodes 12 and 14 positioned on the first substrate 10 side and the first and second electrodes 21 and 23 positioned on the second substrate 20 side, a parasitic capacitance is generated between the electrode 12 or 14 and the conductive film 25, and another parasitic capacitance is generated between the first or second electrode 21 or 23 and the conductive film 25. By application of a predetermined potential to the conductive film 25 in the state where the parasitic capacitances are generated as described above, a change in the potential of the first electrode 21 and the second electrode 23 can be prevented even when the potential applied to the electrode 12 or the electrode 14 is changed. In addition, a change in the potential of the electrode 12 or the electrode 14 can be prevented even when the potential of the first electrode 21 or the second electrode 23 is changed at the time of obtaining positional information. Thus, the change in the potential applied to the electrode 12 or the electrode 14 prevented from appearing as a noise of the positional information, whereby the influence of the noise is not caused in obtaining the positional information.

In the liquid crystal display device of one embodiment of the present invention, the display of images and the obtainment of positional information can be independently performed unlike a liquid crystal display device that allows the electrode 12 of the electrode 14 to have a function of obtaining positional information. In one embodiment of the present invention, even when the display of images and the obtainment of positional information are performed in parallel, the conductive film 25 can prevent the display of images from being influenced by the change in the potential of the first electrode 21 and the second electrode 23 in obtaining the positional information, and in addition, the conductive film 25 can prevent the obtainment of the positional information from being influenced by the change in the potential of the electrode 12 or the electrode 14 in displaying an image. Accordingly, it is not necessary to obtain positional information at high speed within a short period such as a retrace period when display of an image is not performed; thus, the load on a driver circuit that performs control for obtaining the positional information can be reduced.

In the case of a liquid crystal display device in which a pair of electrodes used for obtaining positional information are provided separately on a first plane and a second plane of the second substrate 20, it is difficult to support the second substrate 20 without physically contacting both surfaces of the second substrate 20 in the formation of the electrodes; therefore, an apparatus or a manufacturing process for forming the electrodes becomes complicated. In the liquid crystal display device of one embodiment of the present invention, the first electrode 21, the second electrode 23, and the conductive film 25 can be all formed on one surface size of the second substrate 20, and thus an apparatus and a manufacturing process for forming the first electrode 21 and the second electrode 23 can be simplified.

<Example 2 of Stacked Structure of Pixel in Liquid Crystal Display Device>

Figure 2:
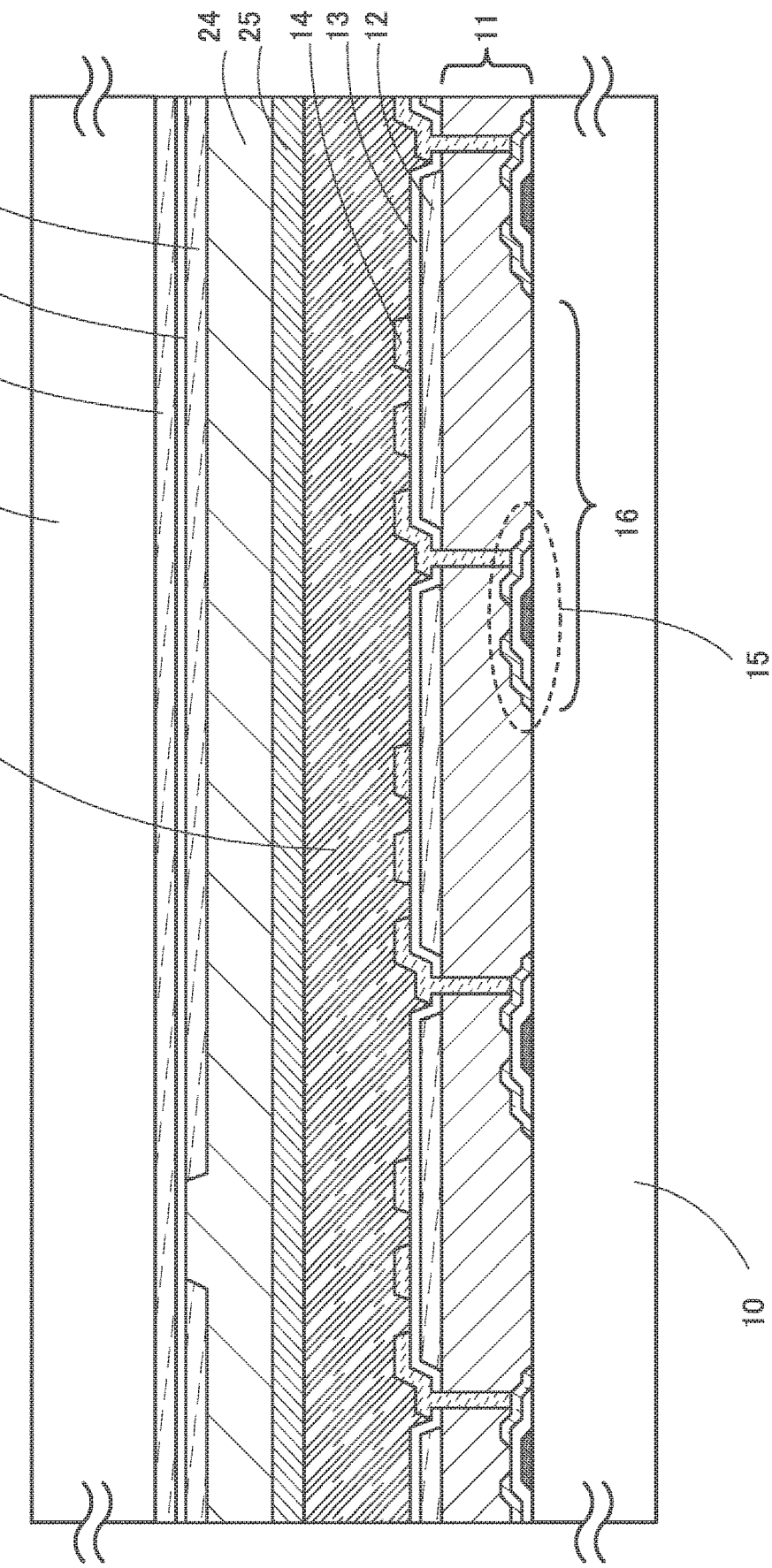
FIG. 2 illustrates a structure of a liquid crystal display device.

Next, FIG. 2 illustrates a more specific example of the stacked structure of the pixel in the liquid crystal display device illustrated in FIG. 1.

The liquid crystal display device illustrated in FIG. 2 includes, on the first substrate 10 side, the element layer 11, the electrode 12 over the element layer 11, the insulating film 13 over the electrode 12, and the electrode 14 positioned over the insulating film 13 and partly overlapping with the electrode 12, like the liquid crystal display device illustrated in FIG. 1. In FIG. 2, the element layer 11 includes a transistor 15, and one of a source and a drain of the transistor 15 is electrically connected to the electrode 14. In other words, in FIG. 2, the electrode 14 serves as a pixel electrode and the electrode 12 serves as a common electrode.

The electrode 14 that is a pixel electrode in a pixel 16 is electrically separated from the electrodes 14 in the other pixels 16. In addition, the electrode 12 that is a common electrode is electrically connected among a plurality of pixels 16.

Note that in this specification, the term "connection" means electrical connection and corresponds to a state in which a current, a voltage, or a potential can be supplied or transmitted. Therefore, a state of being "connected" means not only a state of direct connection but also a state of electrical connection through a circuit element such as a wiring a resistor, a diode, or a transistor so that a current, a voltage, or a potential can be supplied or transmitted.

Note that a "source" of a transistor means a source region that is part of a semiconductor film functioning as an active layer or a source electrode electrically connected to the semiconductor film. Similarly, a "drain" of a transistor means a drain region that is part of a semiconductor film functioning as an active layer or a drain electrode electrically connected to the semiconductor film. A "gate" means a gate electrode.

The terms "source" and "drain" of a transistor interchange with each other depending on the type of the channel of the transistor or the levels of potentials applied to the terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although the connection relation of the transistor is described assuming that the source and the drain are fixed for convenience in some cases, the names of the source and the drain actually interchange with each other depending on the relation of the potentials.

Furthermore, the liquid crystal display device illustrated in FIG. 2 includes, on the second substrate 20 side, the first electrode 21, the insulating film 22 on the first electrode 21, the second electrode 23 that partly overlaps with the first electrode 21 with the insulating film 22 interposed therebetween, the resin film 24 covering the first electrode 21 and the second electrode 23, and the conductive film 25 on the resin film 24, like the liquid crystal display device illustrated in FIG. 1.

Figure 3A:
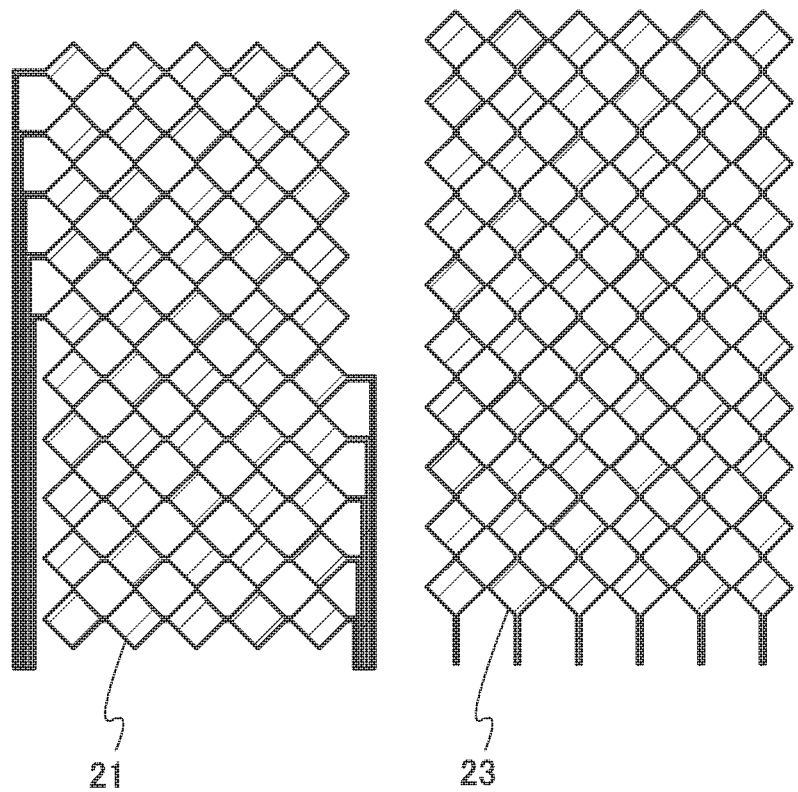
FIGS. 3A and 3B illustrate the shape of electrodes.
Figure 3B:
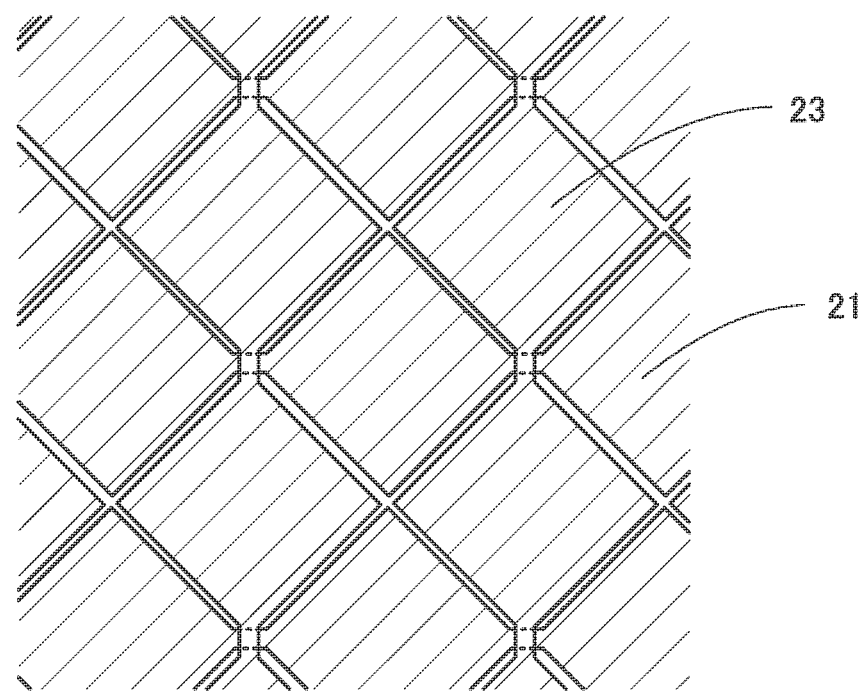

FIG. 3A is a plan view illustrating the respective shapes of the first electrodes 21 and the second electrodes 23, and FIG. 3B is an enlarged plan view of the first electrodes 21 and the second electrodes 23 that overlap with each other.

As illustrated in FIG. 3A, the plurality of first electrodes 21 and the plurality of second electrodes 23 are provided in the liquid crystal display device so as to intersect with each other. In FIG. 3A, the plurality of first electrodes 21 and the plurality of second electrodes 23 each have a shape in which a plurality of rectangular conductive films are connected. As illustrated in FIG. 3B, the plurality of first electrodes 21 and the plurality of second electrodes 23 are provided so that the positions of the rectangular conductive films of the first electrodes 21 are different from those of the rectangular conductive films of the second electrodes 23. At the intersections of the first electrodes 21 and the second electrodes 23, the insulating film 22 is provided between the first electrodes 21 and the second electrodes 23 as illustrated in FIG. 1 and FIG. 2, to prevent the first and second electrodes 21 and 23 from being in contact with each other. At the intersections of the first electrodes 21 and the second electrodes 23, capacitors are formed.

Figure 4:
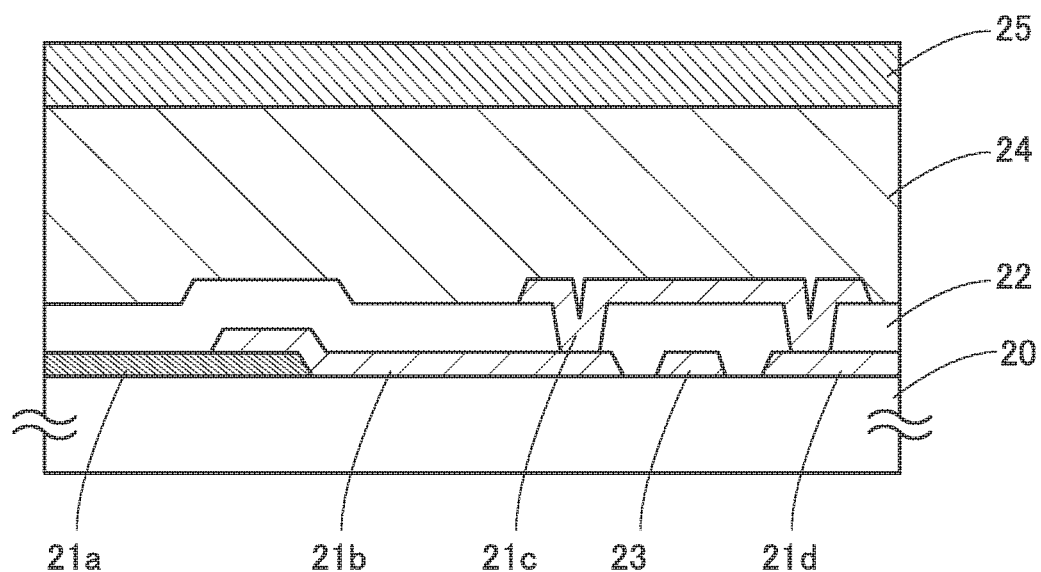
FIG. 4 illustrates a cross-sectional structure of electrodes.

FIG. 4 illustrates an example of a cross-sectional structure of the second substrate 20 at the intersection of the first electrode 21 and the second electrode 23. FIG. 4 illustrates an example in which the first electrode 21 includes electrically connected conductive films 21a, 21b, 21c, and 21d. The conductive film 21a, the conductive film 21b, the conductive film 21d, and the second electrode 23 are formed on the same insulating surface (on the second substrate 20 in FIG. 4). The insulating film 22 is provided over the conductive film 21a, the conductive film 21b, the conductive film 21d, and the second electrode 23. The conductive film 21c is provided over the insulating film 22 so as to straddle the second electrode 23 and is connected to the conductive film 21b and the conductive film 21d in openings provided in the insulating film 22. With such a structure, the first electrode 21 including the conductive films 21a to 21d can intersect with the second electrode 23 without being in contact with the second electrode 23.

The first electrode 21 and the second electrode 23 can be formed of a material selected from the above-described conductive materials having a light-transmitting property with respect to visible light. Note that in the case where the conductive film 21a is a lead wiring the conductive film 21a is not necessarily formed using a conductive material having a light-transmitting property with respect to visible light.

Circuit Structural Example of Pixel Portion

Next, an example of a circuit structure of a pixel portion of a liquid crystal display device will be described.

Figure 5A:
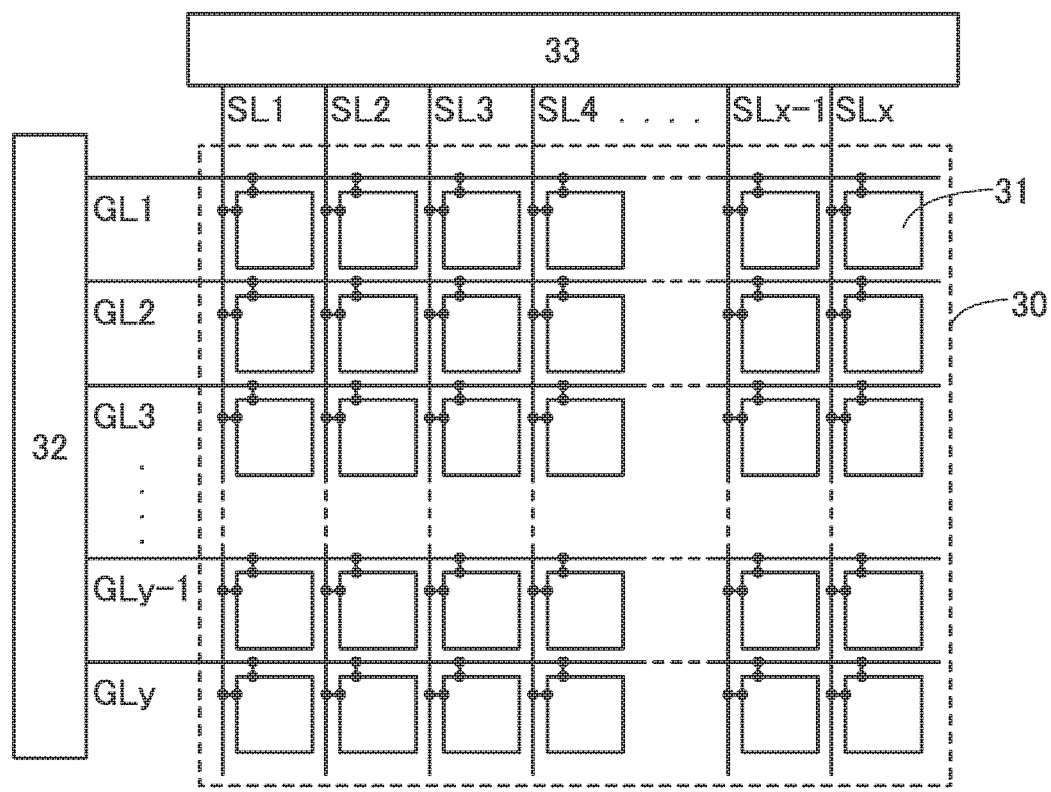
FIGS. 5A and 5B illustrate a structure of a pixel portion and a structure of a pixel.
Figure 5B:
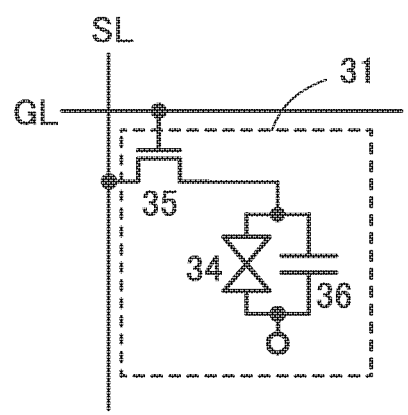

A pixel portion 30 illustrated in FIGS. 5A and 5B includes a plurality of pixels 31, wirings GL (wirings GL1 to GLy, y: a natural number) for selecting the pixels 31 in each row, and wirings SL (wirings SL1 to SLx, x: a natural number) for supping image signals to the selected pixels 31. A driver circuit 32 controls the input of signals to the wiring GL, and a driver circuit 33 controls the input of image signals to the wirings SL. Each of the plurality of pixels 31 is connected to at least one of the wirings GL and at least one of the wirings SL.

Now that the kinds and number of the wirings provide din the pixel portion 30 can be determined by the structure, number, and arrangement of the pixels 31. Specifically, in the pixel portion 30 illustrated in FIGS. 5A and 5B, the pixels 31 are arranged in a matrix of x columns and y rows, and the wirings SL1 to SLx and the wirings GL1 to GLy are provided in the pixel portion 30.

FIG. 5B illustrates an example of the structure of the pixel. The pixel 31 illustrated in FIG. 5B includes a liquid crystal element 34 and a transistor 35 controlling the supply of an image signal to the liquid crystal element 34.

The liquid crystal element 34 includes a pixel electrode, a common electrode, and a liquid crystal layer which contains a liquid crystal material and to which a voltage is applied across the pixel electrode and the common electrode. FIG. 5B illustrates a fringe field switching (FFS) liquid crystal element 34, in which case the pixel electrode and the common electrode partly overlap with each other with an insulating film interposed therebetween. This overlapping area serves as a capacitor for holding a voltage $V_{LC}$ applied between the pixel electrode and the common electrode. Such a capacitor is denoted as a capacitor 36 in FIG. 5B.

The transistor 35 controls whether the potential of an image signal input to a wiring SL is applied to the pixel electrode of the liquid crystal element 34. A predetermined reference potential $V_{COM}$ is applied to the common electrode of the liquid crystal element 34.

Hereinafter, the connection relation between the liquid crystal element 34 and the transistor 35 will be described in detail.

In the pixel 31 illustrated in FIG. 5B, a gate of the transistor 35 is electrically connected to a wiring GL. One of a source and a drain of the transistor 35 is connected to the wiring SL, and the other of the source and the drain of the transistor 35 is connected to the pixel electrode of the liquid crystal element 34.

Note that the pixel 31 may further include another circuit element such as a transistor, a diode, a resistor, a capacitor, or an inductor as needed.

FIG. 5B shows an example in which one transistor 35 is used as a switch for controlling the input of an image signal to the pixel 31. Alternatively, the pixel 31 may include a plurality of transistors functioning as one switch. In the case where a plurality of transistors function as one switch, they may be connected in parallel, in series, or in combination of parallel connection and series connection.

Note that in this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In the case where the transistor 35 has an extremely low off-state current, the voltage applied to the liquid crystal element 34 can be held for a long time. By utilizing this, for example, in the case where image signals having the same image data are written to the pixel 31 during continuous frame periods as in the case of displaying a still image, the displayed gray scale can be maintained even when the driving frequency is lowered, that is, even when the number of times of writing of image signals to the pixel 31 in a certain period is reduced. For example, by using a highly purified oxide semiconductor for a channel formation region of the transistor 35, the interval between writings of image signals can be made longer than or equal to 10 seconds, preferably longer than or equal to 30 seconds, and further preferably longer than or equal to one minute. An increase in the interval between writings of image signals results in a reduction in power consumption.

The transmittance of the liquid crystal element 34 changes when the alignment of liquid crystal molecules changes in accordance with the level of the voltage applied between the pixel electrode and the common electrode. Accordingly, when the transmittance of the liquid crystal element 34 is controlled by the potential of an image signal applied to the wiring SL, gray-scale images can be displayed.

Note that the response time of a liquid crystal from application of voltage to saturation of the change in transmittance is generally about ten milliseconds. Thus, the slow response of the liquid crystal tends to be perceived as a blur of a moving image. As a countermeasure, one semiconductor of the present invention may employ overdriving in which a voltage applied to the liquid crystal element 34 is temporarily increased so that alignment of the liquid crystal is changed quickly. By overdriving, the response speed of the liquid crystal can be increased, a blur of a moving image can be prevented, and the quality of the moving image can be improved.

Further, if the transmittance of the liquid crystal element 34 keeps changing without reaching a constant value after the transistor 35 is turned off, the relative dielectric constant of the liquid crystal also changes; accordingly, the voltage held in the liquid crystal element 34 easily changes. In particular, in the case where the capacitor 36 connected to the liquid crystal element 34 has small capacitance as in one semiconductor of the present invention, the change in the voltage held in the liquid crystal element 34 tends to occur remarkably. However, by the overdriving, the response time can be shortened and therefore the change in the transmittance of the liquid crystal element 34 after the transistor 35 is turned off can be made small. Hence, even in the case where the capacitor 36 connected in parallel to the liquid crystal element 34 has small capacitance, it is possible to prevent the change in the voltage held in the liquid crystal element 34 after the transistor 35 is turned off.

Structural Example of Liquid Crystal Display Device

Next, an example of the structure of the liquid crystal display device of one semiconductor of the present invention will be described.

Figure 6:
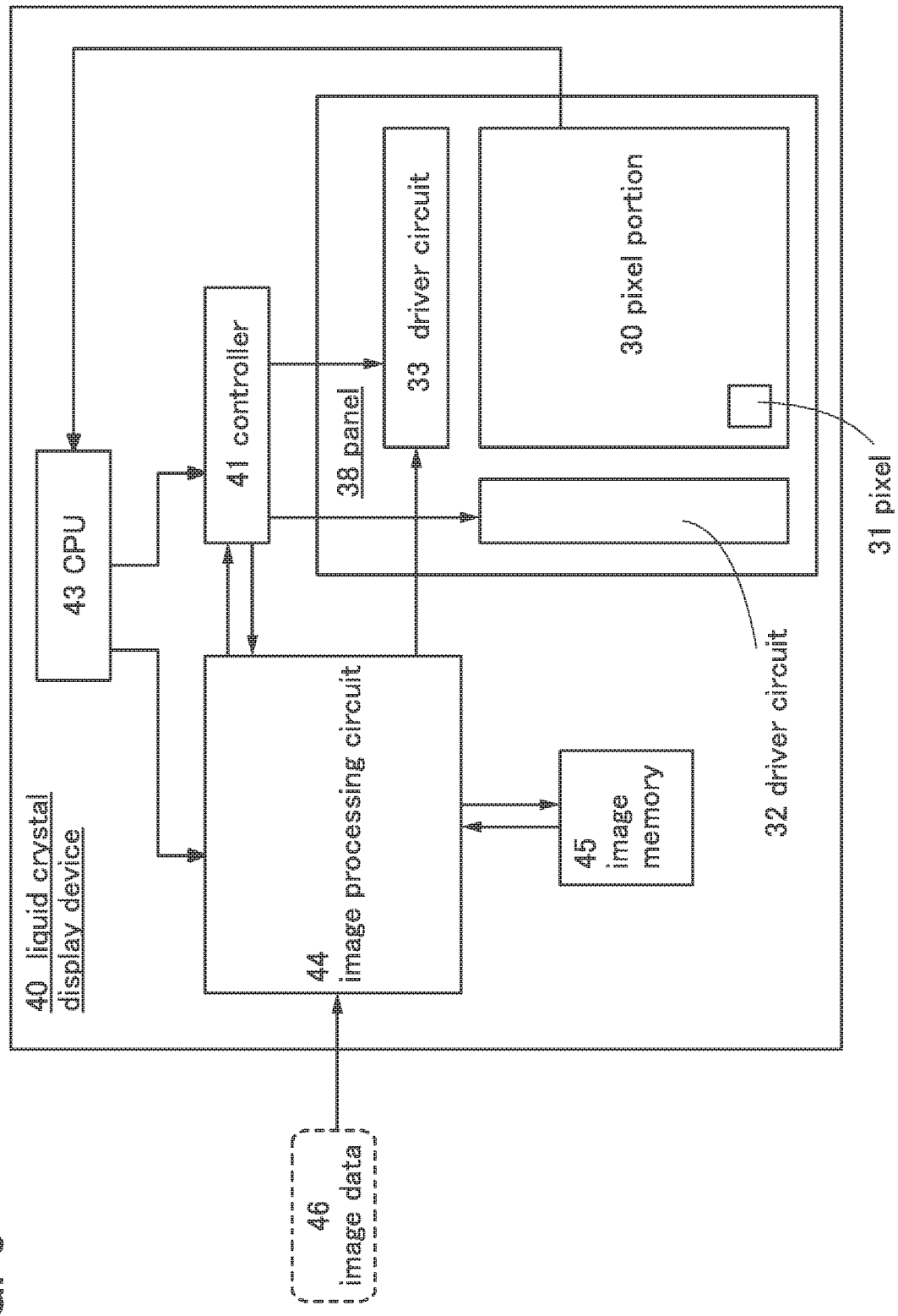
FIG. 6 illustrates a structure of a liquid crystal display device.

FIG. 6 is a block diagram illustrating an example of the structure of the liquid crystal display device of one embodiment of the present invention. A liquid crystal display device 40 illustrated in FIG. 6 includes a panel 38 provided with the plurality of pixels 31 in the pixel portion 30, and a controller 41. The liquid crystal display device 40 illustrated in FIG. 6 also includes a CPU 43, an image processing circuit 44, and an image memory 45. Also in the liquid crystal display device 40 illustrated in FIG. 6, the driver circuit 32 and the driver circuit 33 are provided in the panel 38.

The controller 41 has a function of supplying the panel 38 with various driving signals for controlling the operation of the driver circuit 32, the driver circuit 33, or the like. Examples of the driving signals include a start pulse signal for controlling the operation of the driver circuit 33, a clock signal for the driver circuit 33, a start pulse signal for controlling the operation of the driver circuit 32, and a clock signal for the driver circuit 32.

The pixel portion 30 has a function of displaying an image by displaying gray scales in the respective pixels 31, and further has a function as an input device for obtaining positional information. The CPU 43 has a function of decoding an input instruction in accordance with the positional information obtained in the pixel portion 30 and executing the instruction by totally controlling the operation of various circuits included in the liquid crystal display 40.

Thus, the CPU 43 can execute an instruction to change the panel 38 from an operation state to a non-operation state, or an instruction to change the pixel portion 30 from a non-operation state to an operation state in accordance with the positional information obtained in the pixel portion 30.

For example, in the case where the instruction to change the pixel portion 30 from the operation state to the non-operation state is sent in accordance with the positional information obtained in the pixel portion 30, the CPU 43 given an instruction to the controller 41 to stop the supply of a power source voltage to the pixel portion 30, and to stop the supply of a driving signal to the panel 38.

In the case where an instruction to change the pixel portion 30 from the non-operation state to the operation state is sent in accordance with the positional information obtained in the pixel portion 30, the CPU 43 can give an instruction to the controller 41 to restart the supply of the power source voltage to the pixel portion 30, and to restart the supply of the driving signal to the panel 38.

The image memory 45 has a function of storing image data 46 that has information of image and is input to the liquid crystal display device 40. Note that although just one image memory 45 is provided in the liquid crystal display device 40 in FIG. 6, a plurality of image memories 45 may be provided in the liquid crystal display device 40. For example, in the case where a full-color image is displayed on the pixel portion 30 with the use of three pieces of image data 46 corresponding to the hues such as red, blue, and green, the image memories 45 corresponding to the image data 46 of respective hues may be provided.

As the image memory 45, for example, memory circuits such as a dynamic random access memory (DRAM) or a static random access memory (SRAM) can be used. Alternatively, a video RAM (VRAM) may be used as the image memory 45.

The image processing circuit 44 has a function of writing and reading the image data 46 to and from the image memory 45 in response to an instruction from the controller 41 and generating an image signal data 46.

<Pixel Layout>

Figure 7:
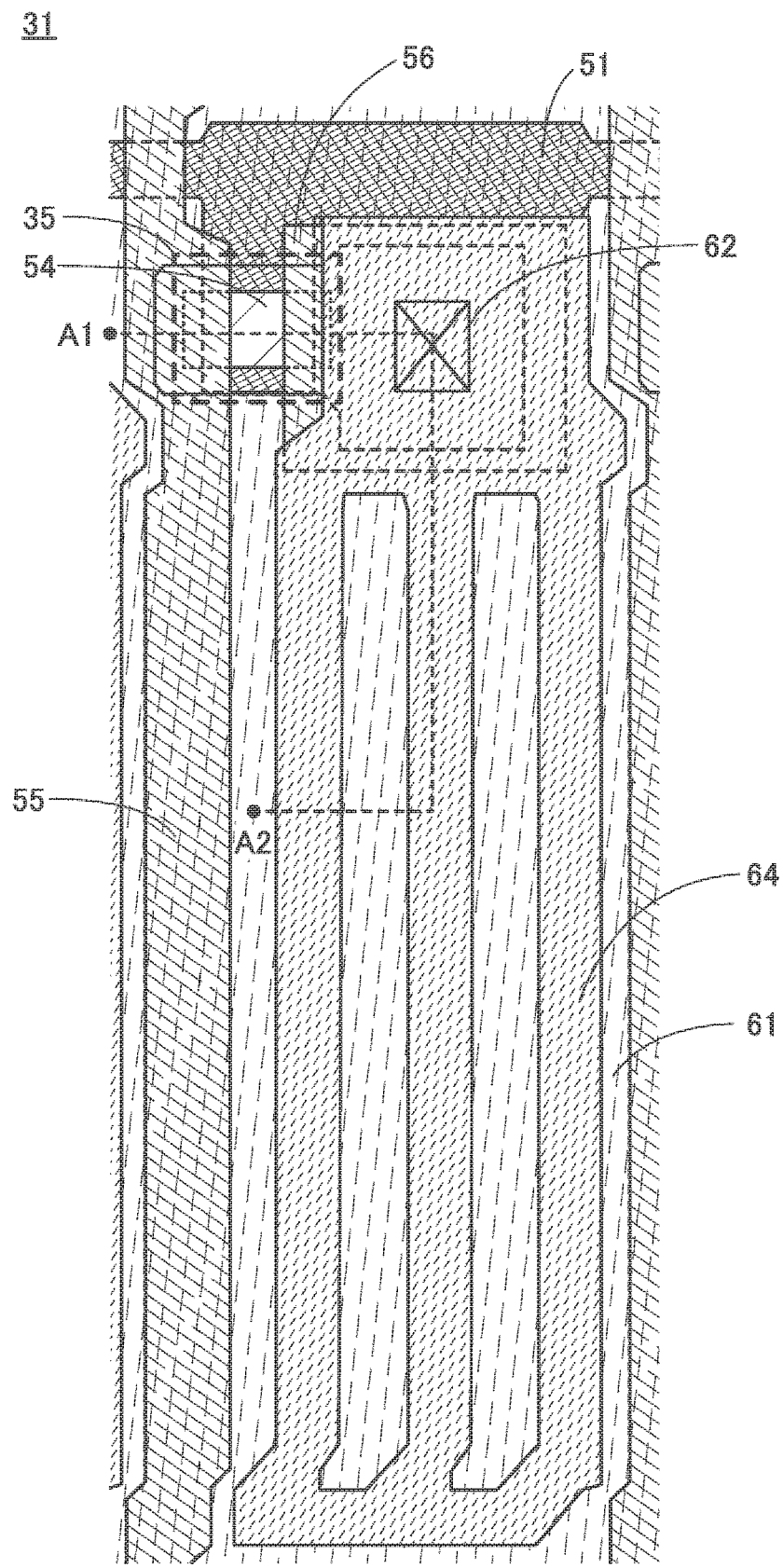
FIG. 7 is a plan view of a pixel.
Figure 8:
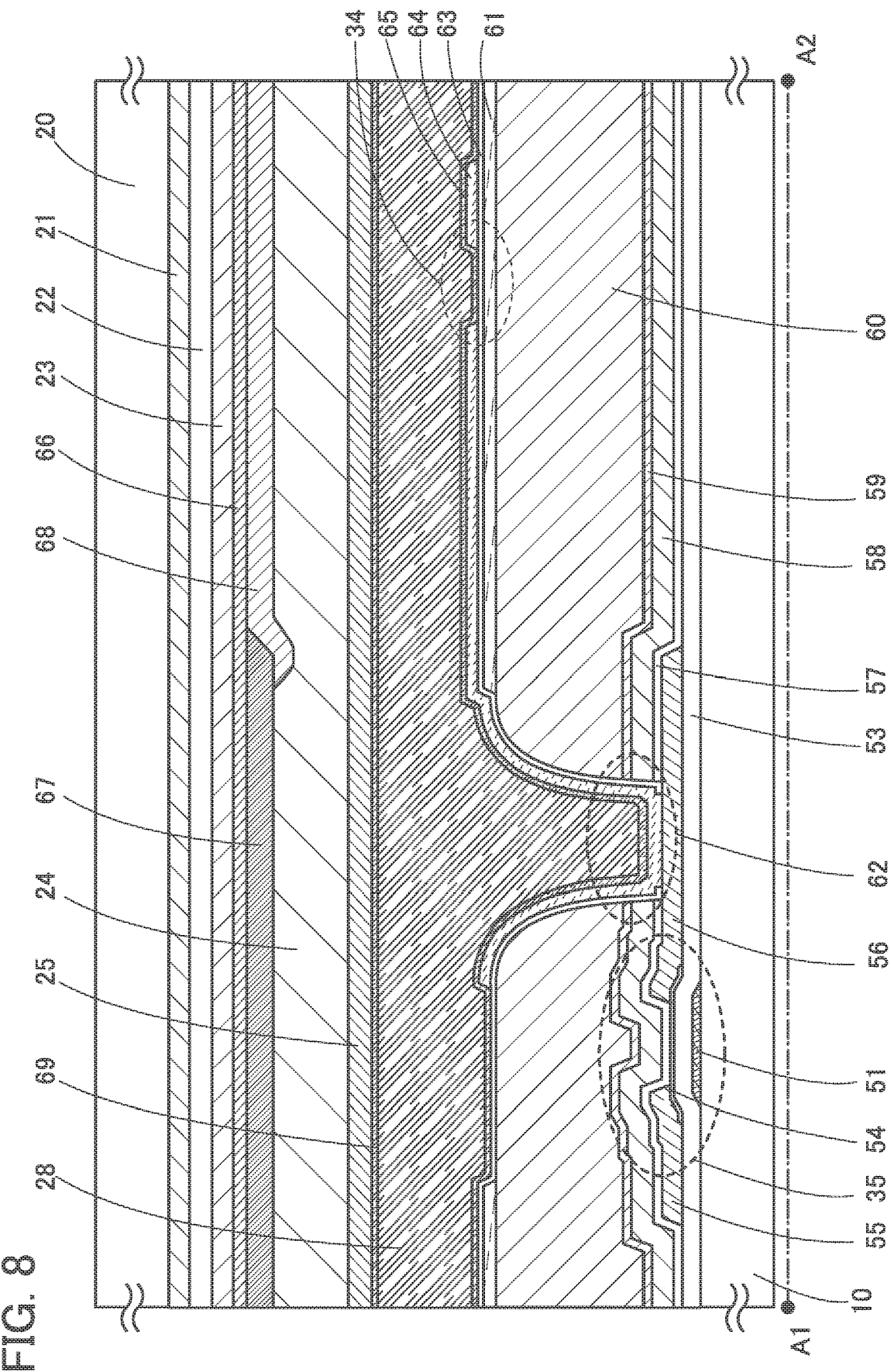
FIG. 8 is a cross-sectional view of a panel.

Next, FIG. 7 illustrates an example of the layout of the pixel 31 in FIG. 5B. Note that in FIG. 7, various insulating films such as a gate insulating film and an oxide film are omitted for clearly showing the layout of the pixel 31. FIG. 8 is a cross-sectional view of a liquid crystal display device using an element substrate illustrated in FIG. 7. In the cross-sectional view of the liquid crystal display device in FIG. 8, the element substrate including the first substrate 10 corresponds to a region taken along dashed line A1-A2 of FIG. 7.

In the pixel 31 illustrated in FIG. 7 and FIG. 8, a conductive film 51 serving as the gate of the transistor 35 and the wiring GL is provided over the first substrate 10 having an insulating surface.

An insulating film 53 is provided over the first substrate 10 so as to cover the conductive film 51. Further, a conductive film 54 of the transistor 35 is provided to overlap with the conductive film 51 with the insulating film 53 interposed therebetween. A conductive film 55 and a conductive film 56 are provided over the semiconductor film 54. The conductive film 55 serves as the wiring SL and the source or the drain of the transistor 35. The conductive film 55 serves as the source or the drain of the transistor 35.

An oxide film 57, an insulating film 58, and an insulating film 59 are stacked in order over the semiconductor film 54, the conductive film 55, and the conductive film 56. An organic resin film 60 is provided over the insulating film 59. An opening 62 is provided in the oxide film 57, the insulating film 58, the insulating film 59, and the organic resin film 60.

A conductive film 61 serving s a common electrode is provided in a region over the organic resin film 60 excluding the opening 62. An insulating film 63 is provided over the conductive film 61. A conductive film 64 serving as a pixel electrode is provided so as to partly overlap with the conductive film 61 with the insulating film 63 interposed therebetween. The insulating film 63 includes an opening overlapping with the opening 62, and the conductive film 64 is connected to the conductive film 56 at the opening of the insulating film 63. An alignment film 65 is provided over the conductive film 64.

The second substrate 20 is provided so as to face the first substrate 10. The second substrate 20 is provided with the first electrode 21 and the second electrode 23 that partly overlap with each other, and the insulating film 22 positioned between the first electrode 21 and the second electrode 23. An insulating film 66 is provided on the first electrode 21 and the second electrode 23.

The insulating film 66 is provided with a shielding film 67 that blocks visible light and a coloring layer 68 that transmits visible light in a specific wavelength range. A resin film 24 is provided on the shielding film 67 and the coloring layer 68, and a conductive film 25 is provided on the resin film 24. An alignment film 69 is provided over the conductive film 25.

Between the first substrate 10 and the second substrate 20, a liquid crystal display 28 containing a liquid crystal material is interposed between the alignment film 65 and the alignment film 69. The liquid crystal element 34 includes the conductive film 61, the conductive film 64, and the liquid crystal layer 28.

Note that in the case where an oxide semiconductor is used for the semiconductor film 54, oxygen might be extracted from the oxide semiconductor by a metal in the conductive films 55 and 56 depending on the conductive material use din the conductive films 55 and 56. In that case, a region of the semiconductor film 54 that is in contact with the conductive films 55 and 56 might become an n-type semiconductor region due to the formation of oxygen vacancies.

The n-type region serves as a source region or a drain region, resulting in a decrease in the contact resistance between the semiconductor film 54 and the conductive films 55 and 56. Accordingly, the formation of the n-type region increases the mobility and on-state current of the transistor 35, which achieves high-speed operation of a semiconductor device using the transistor 35.

Note that the extraction of oxygen by a metal in the conductive films 55 and 56 is probably caused when the conductive films 55 and 56 are formed by a sputtering method or when heat treatment is performed after the formation of the conductive films 55 and 56.

The n-type region is more likely to be formed by forming the conductive films 55 and 56 with use of a conductive material that is easily bonded to oxygen. Examples of such a conductive material include Al, Cr, Cu, Ta, Ti, Mo, and W.

<Manufacturing Method>

Next, an example of a method for manufacturing the element substrate illustrated in FIG. 7 will be described. Although the transistor 35 includes a channel formation region in an oxide semiconductor film in the following description of the method for manufacturing the element substrate, an active layer in the transistor 35 can be an amorphous, microcrystalline, polycrystalline, or single crystal semiconductor film of silicon, germanium, or the like.

Figure 9A:
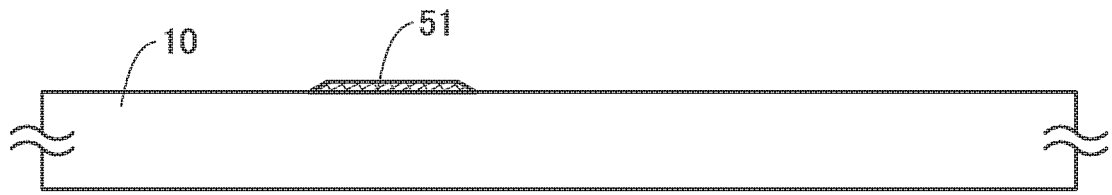
FIGS. 9A to 9D illustrate a method for manufacturing an element substrate.

As illustrated in FIG. 9A, a conductive film is formed over the first substrate 10, and then, the shape of the conductive film is processed (patterned) by etching or the like, whereby the conductive film 51 is formed.

The first substrate 10 is preferably a substrate having heat resistant high enough to withstand a later manufacturing step; for example, a glass substrate, a quartz substrate, a ceramic substrate, or a sapphire substrate is used.

The conductive film 51 may be formed using a single layer or a stacked layer of a conductive film containing one or more kinds selected from aluminum, titanium, chromium, cobalt, nickel, copper, yttrium, zirconium, molybdenum, ruthenium, silver, tantalum, and tungsten. For example, the conductive film 51 may be a conductive film in which a copper film is stacked over a tungsten nitride film or a single-layer tungsten film.

Figure 9B:
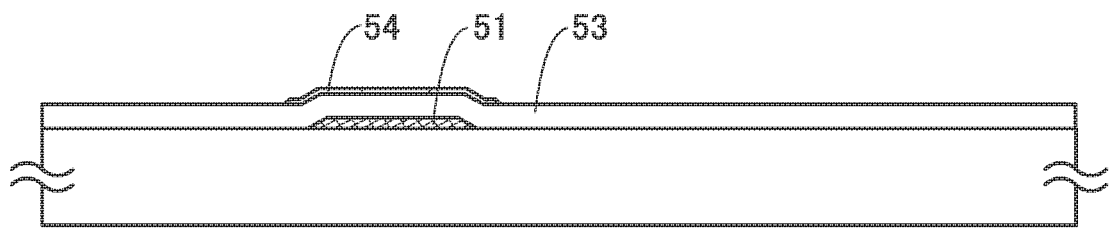

Next, the insulating film 53 is formed to cover the conductive film 51; then, the semiconductor film 54 is formed over the insulating film 53 so as to overlap with the conductive film 51 (see FIG. 9B).

The insulating film 53 may be formed using a single layer or a stacked layer of an insulating film containing one or more kinds of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

For example, in the case where the insulating film 53 has a two-layer structure, a silicon nitride film and a silicon oxide film may be used as the first layer and the second layer, respectively. A silicon oxynitride film may be used as the second layer instead of the silicon oxide film. A silicon nitride oxide film may be used as the first layer instead of the silicon nitride film.

As the silicon oxide film, a silicon oxide film with a low defect density is preferably used. Specifically, a silicon oxide film which has a spin density of $3\times10^{17}$ spins/cm$^3$ or less, preferably $5\times10^{16}$ spins/cm$^3$ or less corresponding to a signal at a g-factor of 2.001 in electron spin resonance (ESR) spectroscopy is used. As the silicon oxide film, a silicon oxide film including excess oxygen is preferably used. As the silicon nitride film, a silicon nitride film from which a small amount of hydrogen and ammonia is released is used. The amount of released hydrogen and ammonia can be measured by thermal desorption spectroscopy (TDS).

An oxide semiconductor film can be used as the semiconductor film 54. When the oxide semiconductor film used as the semiconductor film 54 contains a large amount of hydrogen, the hydrogen and the oxide semiconductor are bonded to each other, so that part of the hydrogen becomes donors and generates electrons serving as carriers. As a result, the threshold voltage of the transistor shifts in the negative direction. Therefore, it is preferable that, after forming the oxide semiconductor film, dehydration treatment (dehydrogenation treatment) be performed to remove hydrogen or moisture from the oxide semiconductor film so that the oxide semiconductor film contains impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment).

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film.

Figure 9C:
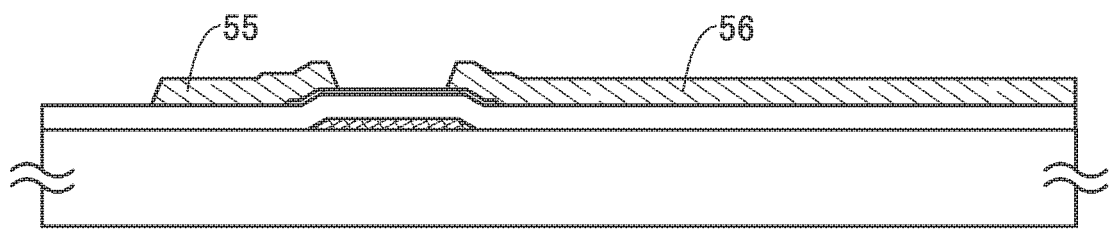

Next, an conductive film is formed over the semiconductor film 54 and the insulating film 53; then, the shape of the conductive film is processed by etching or the like, whereby the conductive films 55 and 56 in contact with the semiconductor film 54 are formed (see FIG. 9C). The conductive films 55 and 56 can be formed using the same conductive material as the conductive film 51.

Figure 9D:
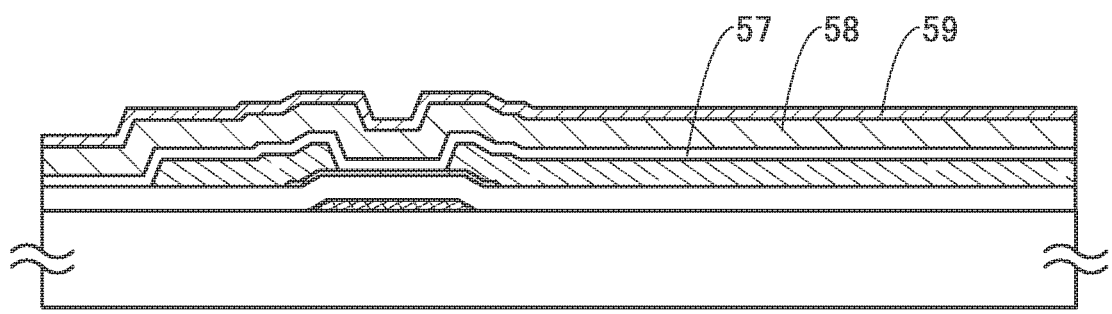

Then, an oxide film or an insulating film is formed to cover the first substrate 10. FIG. 9D shows an example in which the oxide film 57, the insulating film 58, and the insulating film 59 are stacked in order.

A metal oxide is preferably used for the oxide film 57. By using the oxide film 57, the semiconductor film 54 can be isolated from the insulating film 58 containing silicon. Thus, in the case where a metal oxide containing indium is used for the semiconductor film 54, the bond between indium and oxygen at an edge of the semiconductor film 54 can be prevented from being cut by silicon having a higher ability than indium to bind to oxygen, so that the formation of oxygen vacancies can be prevented. As a result, one embodiment of the present invention further increases the reliability of the transistor.

Specifically, the oxide film 57 can be formed by a sputtering method using an In—Ga—Zn-based oxide target with a metal atomic ratio of 1:6:4, 1:3:4, or 1:3:2.

The insulating film 59 is preferably formed without exposure to the atmosphere following the formation of the insulating film 58. After the insulating film 58 is formed, the insulating film 59 is formed in succession by adjusting at least one of the flow rate of the source gas, the pressure, the high-frequency power, and the substrate temperature without exposure to the atmosphere, whereby the concentration of impurities at the interface between the insulating film 58 and the insulating film 59 can be reduced and further oxygen contained in the insulating film 59 can move to the semiconductor film 54, resulting in a reduction in the number of oxygen vacancies in the semiconductor film 54.

As the insulating film 58, a silicon oxide film or a silicon oxynitride film can be formed under the following conditions: the substrate placed in a treatment chamber of a plasma CVD apparatus, which is vacuum-evacuated, is held at a temperature higher than or equal to 180° C. and lower than or equal to 400° C., preferably higher than or equal to 200° C. and lower than or equal to 370° C., the pressure in the treatment chamber is greater than or equal to 30 Pa and less than or equal to 250 Pa, preferably greater than or equal to 40 Pa and less than or equal to 200 Pa with introduction of a source gas into the treatment chamber, and high-frequency power is supplied to an electrode provided in the treatment chamber.

The source gas of the insulating film 58 is preferably a deposition gas containing silicon and an oxidizing gas. Typical examples of the deposition gas containing silicon include silane, disilane, trisilane, and silane fluoride. Examples of the oxidizing gas include oxygen, ozone, dinitrogen monoxide, and nitrogen dioxide.

Under the above conditions, an oxide insulating film that passes oxygen can be formed as the insulating film 58. Further, the insulating film 58 reduces damage to the oxide film 57 in a later step of forming the insulating film 59.

By setting the ratio of the flow rate of the oxidizing gas to the flow rate of the deposition gas containing silicon 100 or higher, the hydrogen content in the insulating film 58 can be reduced and the dangling bonds contained in the insulating film 58 can be reduced. Oxygen moving from the insulating film 59 is captured by the dangling bonds contained in the insulating film 58 in some cases; thus, oxygen in the insulating film 59 can move to the semiconductor film 54 efficiently to fill oxygen vacancies in the semiconductor film 54. As a result, the amount of hydrogen entering the semiconductor film 54 can be reduced and oxygen vacancies contained in the semiconductor film 54 can be reduced. Accordingly, a negative shift in the threshold voltage of the transistor can be reduced, and leakage current between the source and the drain of the transistor can be reduced, leading to an improvement in the electrical characteristics of the transistor.

In this embodiment, as the insulating film 58, a 50-nm-thick silicon oxynitride film is formed by a plasma CVD method under the following conditions: silane with a flow rate of 20 sccm and dinitrogen monoxide with a flow rate of 3000 sccm are used as the source gases, the pressure in the treatment chamber is 40 Pa, the substrate temperature is 220° C., and a high-frequency power of 100 W is supplied to parallel plat electrodes with a high-frequency power supply of 27.12 MHz. Note that a plasma CVD apparatus is a parallel plate plasma CVD apparatus in which the electrode area is 6000 cm$^2$, and power per unit area (power density) into which supplied power is converted $1.6\times10^{-2}$ W/cm$^2$. Under the above conditions, a silicon oxynitride film that passes oxygen can be formed.

As the insulating film 59, a silicon oxide film or a silicon oxynitride film is formed under the following conditions: the substrate placed in a treatment chamber of the plasma CVD apparatus that is vacuum-evacuated is held at a temperature higher than or equal to 180° C. and lower than or equal to 260° C., preferably higher than or equal to 180° C. and lower than or equal to 230° C., the pressure is greater than or equal to 100 Pa and less than or equal to 250 Pa, preferably greater than or equal to 100 Pa and less than or equal to 200 Pa with introduction of a source gas into the treatment chamber, and a high-frequency power of 0.17 W/cm$^2$ to 0.5 W/cm$^2$, preferably 0.25 W/cm$^2$ to 0.35 W/cm$^2$ is supplied to an electrode provided in the treatment chamber.

As the deposition conditions of the insulating film 59, the high-frequency power having the above-described power density is supplied to the electrode in the treatment chamber having the above-described pressure, so that the degradation efficiency of the source gas in plasma is increased, oxygen radicals are increased, and oxidation of the source gas is promoted. Thus, the oxygen content in the insulating film 59 becomes higher than that in the stoichiometric composition. However, in the case where the substrate temperature is within the above temperature range, the bond between silicon and oxygen is weak; thus, part of oxygen is released by heating. Accordingly, it is possible to form an oxide insulating film which contains oxygen at a higher proportion than the stoichiometric composition and from which part of oxygen is released by heating. Further, the insulating film 58 is provided over the oxide film 57. Hence, in the process of forming the insulating film 59, the insulating film 58 has a function of protecting the oxide film 57. Consequently, the insulating film 59 can be formed using the high-frequency power having high power density while damage to the semiconductor film 54 is reduced.

In this embodiment, as the insulating film 59, a 400-nm-thick silicon oxynitride film is formed by a plasma CVD method under the following conditions: silane with a flow rate of 160 sccm and dinitrogen monoxide with a flow rate of 4000 sccm are used as the source gases, the pressure in the treatment chamber is 200 Pa, the substrate temperature is 220° C., and a high-frequency power of 1500 W is supplied to parallel plate electrodes with a high-frequency power supply of 27.12 MHz. Note that the plasma CVD apparatus used here is a parallel plate plasma CVD apparatus in which the electrode area is 6000 cm$^2$, and power per unit area (power density) into which supplied power is converted is $2.5 \times 10^{-1}$ W/cm$^2$.

It is preferable that heat treatment be performed at least after the formation of the insulating film 59 so that oxygen contained in the insulating film 58 or the insulating film 59 enters the oxide film 57 and the semiconductor film 54 to fill oxygen vacancies in the oxide film 57 and the semiconductor film 54. The heat treatment can double as the heat treatment for dehydrogenation or dehydration of the semiconductor film 54.

Next, the organic resin film 60 is formed to cover the first substrate 10. The organic resin film 60 is an underlying film of the conductive film 61 and the conductive film 64 that are formed later, and has a function of preventing roughness of the conductive semiconductor 61 serving as the common electrode and the conductive film 64 serving as the pixel electrode from being formed due to the transistor, the conductive films, and the like. For the organic resin film 60, an acrylic resin, a polyimide resin, or the like can be used.

Figure 10A:
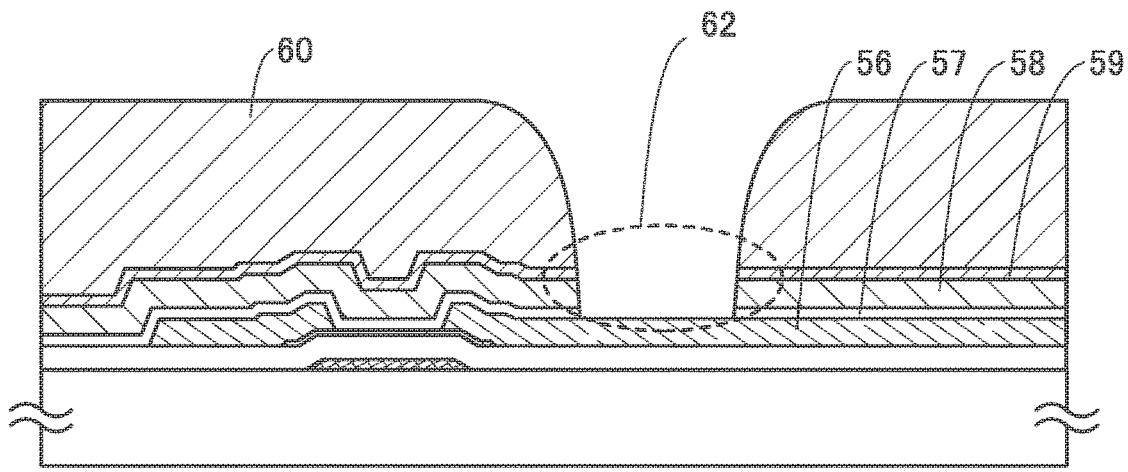
FIGS. 10A to 10C illustrate a method for manufacturing an element substrate.

Then, the opening 62 is formed in the organic resin film 60, the oxide film 57, the insulating film 58, and the insulating film 59 (see FIG. 10A). The conductive film 56 is partly exposed in the opening 62.

Note that the opening 62 may be formed using one photomask. Alternatively, a photomask for forming the opening in the organic resin film 60 and a photomask for forming the opening in the oxide film 57 and the insulating films 58 and 59 may be used to form the opening 62.

Figure 10B:
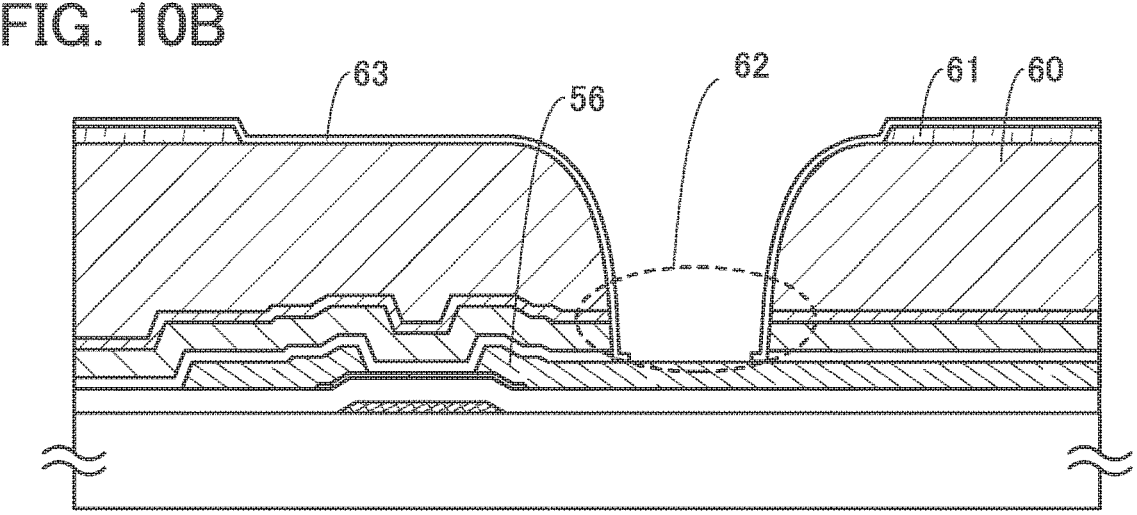

Next, a transparent conductive film is formed over the organic resin film 60 and processed into a desired shape by etching or the like, whereby the conductive film 61 is formed. Then, the insulating film 63 is formed over the conductive film 61 and the organic resin film 60. After that, an opening is formed in the insulating film 63 so that the conductive film 56 is partly exposed in the opening 62 (see FIG. 10B).

The insulating film 63 has a function of preventing entry of water or impurities from the outside. The insulating film 63 also serves as a dielectric of the capacitor 36 formed in a region where the conductive film 61 overlaps with the conductive film 64. The insulating film 63 is preferably formed using a nitride oxide; for example, a silicon nitride film or a silicon nitride oxide film may be formed.

Figure 10C:
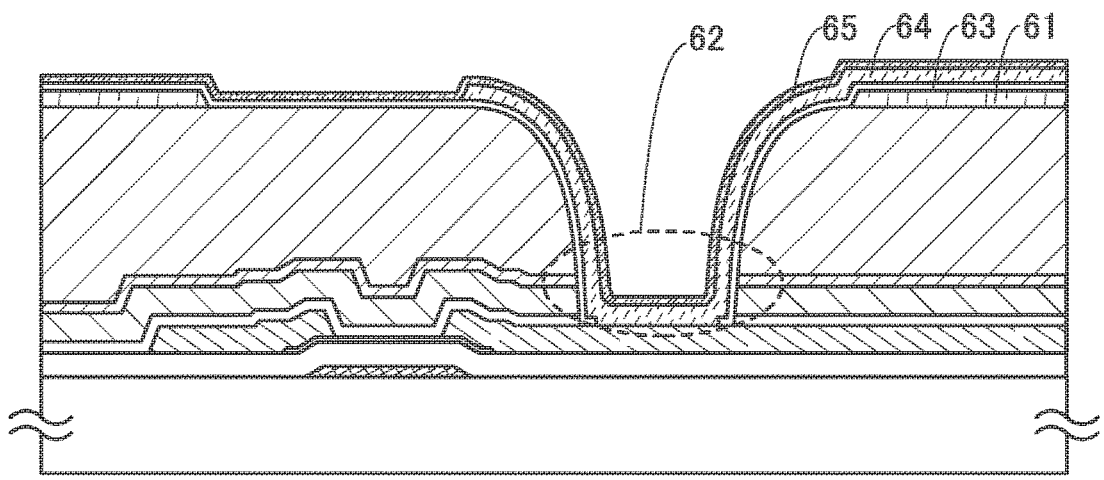

Next, a transparent conductive film is formed over the insulating film 63 and the shape there of is processed by etching or the like, whereby the conductive film 64 is formed. The conductive film 64 is connected to the conductive film 56. Then, the alignment film 65 is formed over the conductive film 64 (see FIG. 10C).

As the transparent conductive film used for forming the conductive film 61 and the conductive film 64, a conductive film containing the following can be used: indium oxide containing tungsten oxide, indium zinc oxide containing tungsten oxide, indium oxide containing titanium oxide, indium tin oxide containing titanium, oxide, indium tin oxide, indium zinc oxide, zinc oxide, zinc oxide to which gallium is added, indium tin oxide to which silicon oxide is added, or the like.

The alignment film 65 can be formed using an organic resin such as polyimide or poly(vinyl alcohol). Alignment treatment for aligning liquid crystal molecules in a certain direction, such as rubbing, is performed on a surface of the alignment film. A roller wrapped with cloth of nylon or the like is rolled in a certain direction while being in contact with the alignment film 65 so that the surface of the alignment film 65 can be rubbed. Note that it is also possible to directly form the alignment film 65 that has alignment characteristics with the use of an inorganic material such as silicon oxide by vapor deposition, without alignment treatment.

Through the above steps, the element substrate illustrated in FIG. 7 can be obtained.

Figure 11A:
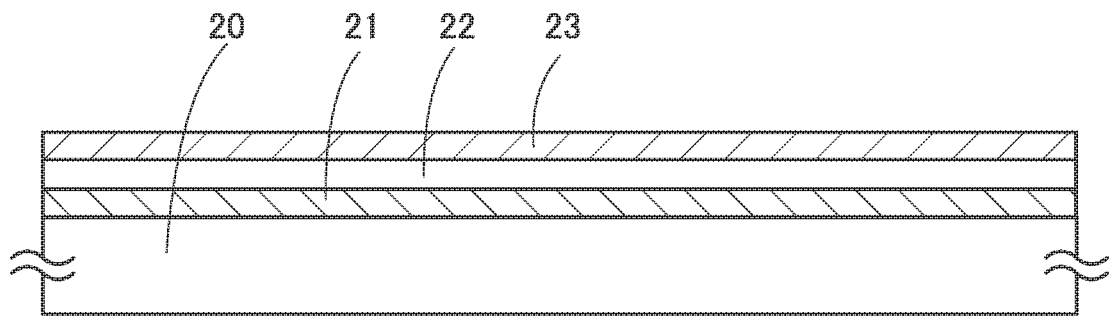
FIGS. 11A to 11C illustrate a method for manufacturing a counter substrate.

As illustrated in FIG. 11A, the first electrode 21 over the second substrate 20, the insulating film 22 over the first electrode 21, and the second electrode 23 over the insulating film 22 are formed. The second substrate 20 has a light-transmitting property with respect to visible light, and can be a glass substrate, a quartz substrate, or the like. Alternatively, a plastic substrate or the like can be used if the substrate can have heat resistance enough to withstand the later manufacturing process.

The first electrode 21 and the second electrode 23 can be formed using conductive materials having a light-transmitting property. Examples of the conductive materials having a light-transmitting property include indium oxide containing tungsten oxide, indium zinc oxide containing tungsten oxide, indium oxide containing titanium oxide, indium tin oxide containing titanium, oxide, indium tin oxide, indium zinc oxide, zinc oxide, zinc oxide containing gallium, and indium tin oxide containing silicon oxide. In this embodiment, the first electrode 21 and the second electrode 23 are formed using indium tin oxide containing silicon oxide, to have a thickness of 220 nm.

Figure 11B:
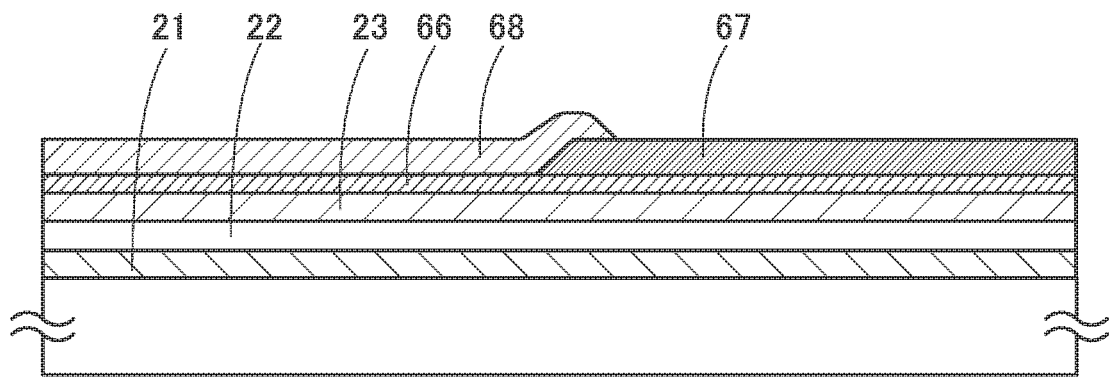

Next, as illustrated in FIG. 11B, the insulating film 66 is formed over the first electrode 21 and the second electrode 23. Then, over the insulating film 66, the shielding film 67 that blocks visible light and the coloring layer 68 that transmits visible light in a specific wavelength range are formed. FIG. 11B illustrates a case in which the coloring layer 68 is formed after formation of the shielding film 67, and the shielding film 67 and the coloring layer 68 partly overlap with each other. The shielding film 67 can be formed using an organic resin containing black colorant such as carbon black or titanium oxide whose oxidation number is smaller than that of titanium dioxide. Alternatively, the shielding film 67 can be a chromium film.

Figure 11C:
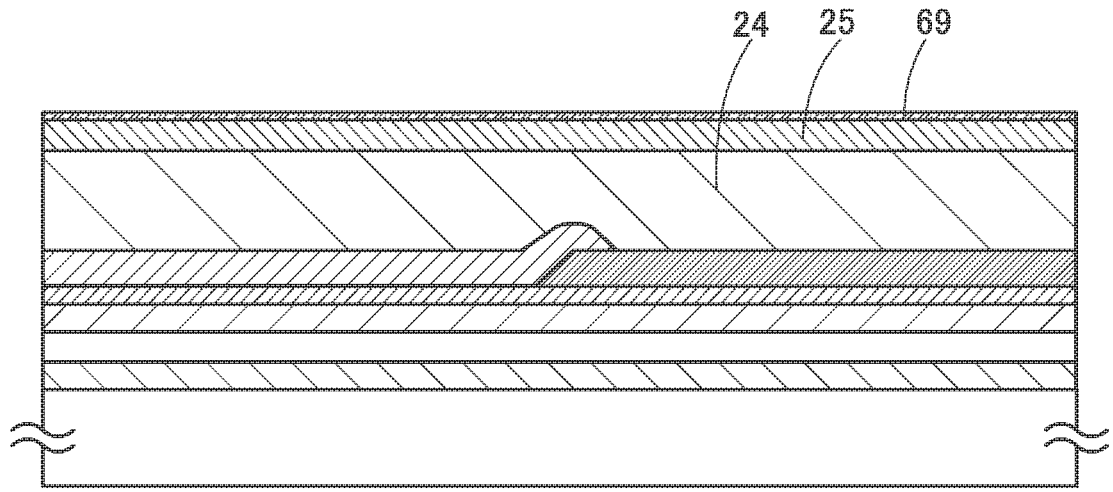

Next, as illustrated in FIG. 11C, the resin film 24 is formed over the shielding film 67 and the coloring layer 68, using an organic resin such as acrylic resin, and then the conductive film 25 and the alignment film 67 are formed in order over the resin film 24.

It is preferable that the thickness of the resin film 24 be approximately more than or equal to 1 µm and less than or equal to 3 µm in order to increase the flatness of the conductive film 25 formed layer. In this embodiment, the resin film 24 is formed using an acrylic resin to a thickness of approximately 1 µm.

The conductive film 25 can be formed using a conductive material having a light-transmitting property, like the first electrode 21 and the second electrode 23. In this embodiment, the conductive film 25 is formed using indium tin oxide containing silicon oxide to a thickness of 220 nm.

The alignment film 69 can be formed using a material and a formation method similar to those of the alignment film 65.

Through the manufacturing process described above, a counter substrate can be formed.

After the element substrate and the counter substrate are formed, the liquid crystal layer 28 is sealed between the first substrate 10 and the second substrate 20 as illustrated in FIG. 8, whereby the panel of the liquid crystal display device is completed. Injection of the liquid crystal for forming the liquid crystal layer 28 may be performed by a dispenser method (dripping method) or a dipping method (pumping method).

<Semiconductor Film>

A highly purified oxide semiconductor (purified OS) obtained by reduction of impurities such as moisture or hydrogen which serves as an electron donor (donor) and by reduction of oxygen vacancies is an intrinsic (i-type) semiconductor or a substantially i-type semiconductor. Thus, a transistor including a channel formation region in a highly purified oxide semiconductor film has extremely low off-state current and high reliability.

Specifically, carious experiments can prove low off-state current of the transistor including a channel formation region in a highly purified oxide semiconductor film. For example, the off-state current of even an element having a channel width of $1\times10^6$ µm and a channel length of 10 µm can be less than or equal to the measurement limit of a semiconductor parameter analyzer, that is, less than or equal to $1\times10^{-13}$ A at a voltage between the source electrode and the drain electrode (a drain voltage) of 1 V to 10 V. In this case, it can be seen that off-state current standardized on the channel width of the transistor is lower than or equal to 100 zA/µm. In addition, the off-state current was measured using a circuit in which a capacitor and a transistor were connected to each other and charge flowing into or from the capacitor was controlled by the transistor. In the measurement, a highly purified oxide semiconductor film was used for a channel formation region in the amount of charge of the capacitor per unit time. As a result, it was found that when the voltage between the source electrode and the drain electrode of the transistor is 3 V, a lower off-state current of several tens of yoctoamperes per micrometer (yA/µm) is obtained. Consequently, the off-state current of the transistor in which a highly purified oxide semiconductor film is used for a channel formation region is much lower than that of a transistor including crystalline silicon.

Unless otherwise noted, the off-state current in this specification refers to a current that flows between a source and a drain of a transistor in the cut-off region.

In the case of using an oxide semiconductor film as the semiconductor film, the oxide semiconductor preferably contains at least indium (In) or zinc (Zn). The oxide semiconductor preferably contains, in addition to In and Zn, gallium (Ga), tin (Sn), hafnium (Hf), aluminum (Al), and/or zirconium (Zr) that serve as a stabilizer for reducing variations in electric characteristics of the transistor including the oxide semiconductor.

Among the semiconductors, unlike silicon carbide, gallium nitride, or gallium oxide, In—Ga—Zn-based oxide, In—Sn—Zn-based oxide, or the like has an advantage of high mass productivity because a transistor with favorable electrical characteristics can be formed by sputtering or a wet process. Further, unlike silicon carbide, gallium nitride, or gallium oxide, with the use of the In—Ga—Zn-based oxide, a transistor with favorable electrical characteristics can be formed over a glass substrate, and a large substrate can be used.

As another stabilizer, one or more kinds of lanthanoid such as lanthanum (La), cerium (Ce), praseodynium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, any of the following oxides can be used, for example: indium oxide, gallium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—La—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Zn-based oxide, In—Hf—Zn-based oxide.

Note that, for example, an In—Ga—Zn-based oxide means an oxide containing In, Ga, and Zn and there is no particular limitation on the ratio of In, Ga, and Zn. Further the In—Ga—Zn-based oxide may contain a metal element other than In, Ga, and Zn. The In—Ga—Zn-based oxide has sufficiently high resistance when no electric field is applied thereto, so that off-state current can be sufficiently reduced. Moreover, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to any of the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), In:Sn:Zn=2:1:5 (=1/4:1/8:5/8) or an oxide with an atomic ratio close to any of the above atomic ratios may be used.

For example, with an In—Sn—Zn-based oxide, high mobility can be achieved relatively easily. However, even with an In—Ga—Zn-based oxide, mobility can be increased by reducing the defect density in the bulk.

A structure of an oxide semiconductor film is described below.

The oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example of the amorphous oxide semiconductor film is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is none of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

Furthermore, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when a CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Furthermore, when the CAAC-OS film is analyzed by an in-plane method in which an X-ray enters a sample in a direction substantially perpendicular to the c-axis, a peak appears frequently when 2θ is around 56°. This peak is derived from the (110) plane of the InGaZnO$_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of InGaZnO$_4$, six peaks appear. The six peaks are derived from crystal planes equivalent to the (110) plane. On the other hand, in the case of a CAAC-OS film, a peak is not clearly observed when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a top surface of the CAAC-OS film. Thus, for example, in the case where the shape of the CAAC-OS film is changed by etching or the like, the c-axis might not be necessarily parallel to a normal vector of a formation surface or a top surface of the CAAC-OS film.

The degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film various depending on regions.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferably that in the CAAC-OS film, a peak of 2θ appear at around 31° and a peak of 2θ do not appear at around 36°.

With the use of the CAAC-OS film in a transistor, change in electrical characteristics of the transistor due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

For example, the CAAC-OS film is formed by sputtering with a polycrystalline metal oxide sputtering target. By collision of ions with the target, a crystal region included in the target may be separated from the target along an a-b plane; in other words, sputtered particles having a plane parallel to an a-b plane (flat-plate-like sputtered particle or pellet-like sputtered particle) may flake off from the target. In this case, the flat-plate-like sputtered particles or the pellet-like sputtered particles reach a substrate in the state of maintaining their crystal state, whereby the CAAC-OS film can be formed.

The CAAC-OS film is preferably deposited under the following conditions.

Decay of the crystal state due to impurities can be prevented by reducing the amount of impurities entering the CAAC-OS film during the deposition, for example, by reducing the concentration of impurities (e.g., hydrogen, water, carbon dioxide, and nitrogen) that exist in a treatment chamber or by reducing the concentration of impurities in a deposition gas. Specifically, a deposition gas with a dew point of −80° C. or lower, preferably −100° C. or lower is used.

By increasing the substrate temperature during the deposition, migration of a sputtered particle is likely to occur after the sputtered particle reaches a substrate surface. Specifically, the substrate temperature during the deposition ranges from 100° C. to 740° C., preferably from 200° C. to 500° C. By increasing the substrate temperature during the deposition, when the flat-plate-like sputtered particle or the pellet-like sputtered particle reaches the substrate, migration occurs on the substrate surface; thus a flat plane of the flat-plate-like sputtered particle or the pellet-like sputtered particle is attached to the substrate.

It is preferably that the proportion of oxygen in the deposition gas be increased and the electric power be optimized in order to reduce plasma damage in the deposition. The proportion of oxygen in the deposition gas is 30 vol % or higher, preferably 100 vol %.

As an example of the target, an In—Ga—Zn-based oxide target is described below.

The polycrystalline in In—Ga—Zn-based oxide target is made by mixing $InO_X$ powder, $GaO_Y$ powder, and $ZnO_Z$ powder in a predetermined molar ratio, applying pressure, and performing heat treatment at a temperature of 1000° C. to 1500° C. Note that X, Y, and Z re reach a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for miming powder can be determined as appropriate depending on the desired target.

Alkali metal is not an element included in an oxide semiconductor and thus is an impurity. Likewise, alkaline earth metal is an impurity when the alkaline earth metal is not a component of the oxide semiconductor. Alkali metal, in particular, Na becomes $Na^+$ when an insulating film in contact with the oxide semiconductor film is an oxide and Na diffuses into the insulating film. Further, in the oxide semiconductor film, Na cuts or enters a bond between metal and oxygen which are components of the oxide semiconductor. As a result, the characteristics of the transistor deteriorate, for example, the transistor is placed in a normally-on state due to a negative shift of the threshold voltage or the mobility is decreased. In addition, the characteristics of transistors vary. Specifically, the measurement value of a sodium (Na) concentration by secondary ion mass spectrometry is preferably $5 \times 10^{16}/cm^3$ or lower, further preferably $1 \times 10^{16}/cm^3$ or lower, still further preferably $1 \times 10^{15}/cm^3$ or lower. Similarly, the measurement value of a lithium (Li) concentration is preferably $5 \times 10^{15}/cm^3$ or lower, further preferably $1 \times 10^{15}/cm^3$ or lower. Similarly, the measurement value of a potassium (K) concentration is preferably $5 \times 10^{15}/cm^3$ or lower, further preferably $1 \times 10^{15}/cm^3$ or lower.

When metal oxide containing indium is used, silicon or carbon having higher bond energy with oxygen than indium might but the bond between indium and oxygen, so that an oxygen vacancy may be formed. Accordingly, when silicon or carbon is contained in the oxide semiconductor film, the electric characteristics of the transistor are likely to deteriorate as in the case of using alkali metal or alkaline earth metal. Thus, the concentrations of silicon and carbon in the oxide semiconductor film are preferably low. Specifically, the carbon (C) concentration or the silicon (Si) concentration measured by secondary ion mass spectrometry is $1 \times 10^{18}/cm^3$ or lower. In this case, the deterioration of the electric characteristics of the transistor can be prevented, so that the reliability of a liquid crystal display device can be improved.

A metal in the source electrode and the drain electrode might extract oxygen from the oxide semiconductor film depending on a conductive material used for the source and drain electrodes. In such a case, a region of the oxide semiconductor film in contact with the source electrode or the drain electrode becomes an n-type region due to the formation of an oxygen vacancy.

The n-type region serves as a source region or a drain region, resulting in a decrease n the contact resistance between the oxide semiconductor film and the source electrode or the drain electrode. Accordingly, the formation of the n-type region increases the mobility and on-state current of the transistor, which achieves high-speed operation of a switch circuit using the transistor.

Note that the extraction of oxygen by a metal in the source electrode and the drain electrode is probably caused when the source and drain electrodes are formed by sputtering or when heat treatment is performed after the formation of the source and drain electrodes.

The n-type region is more likely to be formed when the source and drain electrodes are formed using a conductive material that is easily bonded to oxygen. Examples of such a conductive material include Al, Cr, Cu, Ta, Ti, Mo, and W.

The oxide semiconductor film is not limited to a single-layer metal oxide film and may have a stacked structure of a plurality of metal oxide films. In a semiconductor film in which first to third metal oxide films are sequentially stacked, for example, the first metal oxide film and the third metal oxide film are each an oxide film which contains at least one of the metal elements contained in the second metal oxide film and has the lowest conduction band energy that is closer to the vacuum level than that of the second metal oxide film by 0.05 eV or more, 0.07 eV or more, 0.1 eV or more, or 0.15 eV or more and 2 eV or less, 1 eV or less, 0.5 eV or less, or 0.4 eV or less. Further, the second metal oxide film preferably contains at least indium in order to increase the carrier mobility.

In the transistor including the above semiconductor film, when a voltage is applied to the gate electrode so that an electric field is applied to the semiconductor film, a channel region is formed in the second metal oxide film, whose energy at the bottom of the conduction band is the lowest. That is, since the third metal oxide film is provided between the second metal oxide film and a gate insulating film, a channel region can be formed in the second metal oxide film that is insulated from the gate insulating film.

Since the third metal oxide film contains at least one of the metal elements contained in the second metal oxide film, interface scattering is unlikely to occur at the interface between the second metal oxide film and the third metal oxide film. Thus, the movement of carriers is unlikely to be inhibited at the interface, which results in an increase in the field-effect mobility of the transistor.

If an interface level is formed at the interface between the second metal oxide film and the first metal oxide film, a channel region is formed also in the vicinity of the interface, which causes a change in the threshold voltage of the transistor. However, since the first metal oxide film contains at least one of the metal elements contained in the second metal oxide film, an interface level is unlikely to be formed at the interface between the second metal oxide film and the first metal oxide film. Accordingly, the above structure can reduce variations in the electrical characteristics of the transistor, such as the threshold voltage.

Further, it is preferable that a plurality of metal oxide films be stacked so that an interface level due to impurities existing between the metal oxide films, which inhibits carrier flow, is not formed at the interface between the metal oxide films. This is because if impurities exist between the stacked metal oxide films, the continuity of the lowest conduction band energy between the metal oxide films is lost, and carriers are trapped or disappear by recombination in the vicinity of the interface. By reducing impurities existing between the films, a continuous junction (here, particularly a U-shape well structure whose lowest conduction band energy is changed continuously between the films) is formed more easily than the case of merely stacking a plurality of metal oxide films that contain at least one common metal as a main component.

In order to form continuous junction, the films need to be stacked successively without being exposed to the air by using a multi-chamber deposition system (sputtering system) provided with a load lock chamber. Each chamber of the sputtering system is preferably evacuated to a high vacuum (to about $5 \times 10^{-7}$ Pa to $1 \times 10^{-4}$ Pa) by an adsorption vacuum pump such as a cryopump so that water and the like acting as impurities for the oxide semiconductor are removed as much as possible. Alternatively, a combination of a turbo molecular pump and a cold trap is preferably used to prevent back-flow of a gas from an exhaust system into a chamber.

Not only high vacuum evaporation in a chamber but also high purity of a sputtering gas is necessary to obtain a high-purity intrinsic oxide semiconductor. As an oxygen gas or an argon gas used as the sputtering gas, a gas that is highly purified to have a dew point of −40° C. or lower, preferably −80° C. or lower, further preferably −100° C. or lower is used, so that entry of moisture or the like into the oxide semiconductor film can be prevented as much as possible.

For example, the first metal oxide film and/or the third metal oxide film can be an oxide film that contains aluminum, silicon, titanium, gallium, germanium, yttrium, zirconium, tin, lanthanum, cerium, or hafnium at a higher atomic ratio than the second metal oxide film. Specifically, the first metal oxide film and/or the third metal oxide film is preferably an oxide film with a content of any of the above elements 1.5 times or more, preferably 2 times or more, further preferably 3 times or more that of the second metal oxide film in an atomic ratio. The above element is strongly bonded to oxygen and thus has a function of suppressing generation of oxygen vacancies in the oxide film. Accordingly, the first metal oxide film and/or the third metal oxide film can be an oxide film in which oxygen vacancies are less likely to be generated than in the second metal oxide film.

Specifically, when both the second metal oxide film and the first or third metal oxide film are In-M-Zn-based oxide films and the atomic ratio of the first or third metal oxide film is In:M:Zn=$x_1$:$y_1$:$z_1$ and that of the second meal oxide film is In:M:Zn=$x_2$:$y_2$:$z_2$, the atomic ratios are set so that $y_1/x_1$ is larger than $y_2/x_2$. Note that the element M is a metal element whose bonding strength to oxygen is larger than that of In, and can be Al, Ti, Ga, Y, Zr, Sn, La, Ce, Nd, or Hf, for example. The atomic ratios are preferably set so that $y_1/x_1$ is 1.5 times or more, preferably 2 times or more, further preferably 3 times or more $y_2/x_2$. Here, in the second metal oxide film, $y_2$ is preferably larger than or equal to $x_2$ because the transistor can have stable electrical characteristics. Note that the field-effect mobility of the transistor is reduced when $y_2$ is 3 times or more $x_2$; accordingly, $y_2$ is preferably smaller than 3 times $x_2$.

The thickness of first metal oxide film and the third metal oxide film ranges from 3 nm to 100 nm, preferably from 3 nm to 50 nm. The thickness of the second metal oxide film ranges from 3 nm to 200 nm, preferably from 3 nm to 100 nm, further preferably from 3 nm to 50 nm.

In the three-layer semiconductor film, the first to third meal oxide films can be amorphous or crystalline. Note that the transistor can have stable electrical characteristics when the second metal oxide film where a channel region is formed is crystalline; therefore, the second metal oxide film is preferably crystalline.

Note that a channel formation region refers to a region of a semiconductor film of a transistor that overlaps with a gate electrode and is located between a source electrode and a drain electrode. Further, a channel region refers to a region through which current mainly flows in the channel formation region.

For example, when an In—Ga—Zn-based oxide film formed by sputtering is used as the first and third metal oxide films, a sputtering target that is In—Ga—Zn-based oxide containing In, Ga, and Zn at an atomic ratio of 1:3:2 can be used to deposit the first and third metal oxide films. The deposition conditions can be as follows, for example: an argon gas (flow rate: 30 sccm) and an oxygen gas (flow rate: 15 sccm) are used as the deposition gas; the pressure is 0.4 Pa; the substrate temperature is 200° C.; and the DC power is 0.5 kW.

Further, when the second metal oxide film is a CAAC-OS film, a sputtering target including polycrystalline In—Ga—Zn-based oxide containing In, Ga, and Zn at an atomic ratio of 1:1:1 is preferably used to deposit the second metal oxide film. The deposition conditions can be as follows, for example: an argon gas (flow rate: 30 sccm) and an oxygen gas (flow rate: 15 sccm) are used as the deposition gas; the pressure is 0.4 Pa; the substrate temperature is 300° C.; and the DC power is 0.5 kW.

Note that the end portions of the semiconductor film in the transistor may be tapered or rounded.

Also in the case where a semiconductor film including stacked metal oxide films is used in the transistor, a region in contact with the source electrode or the drain electrode may be an n-type region. Such a structure increases the mobility and on-state current of the transistor and achieves high-speed operation of a liquid crystal display device including the transistor. Further, when the semiconductor film including the stacked metal oxide films is used in the transistor, the n-type region particularly preferably reaches the second metal oxide film part of which is to be a channel region, because the mobility and on-state current of the transistor are further increased and higher-speed operation of the liquid crystal display device is achieved.

<Plan View and Cross-Sectional View of Liquid Crystal Display Device>

Figure 12:
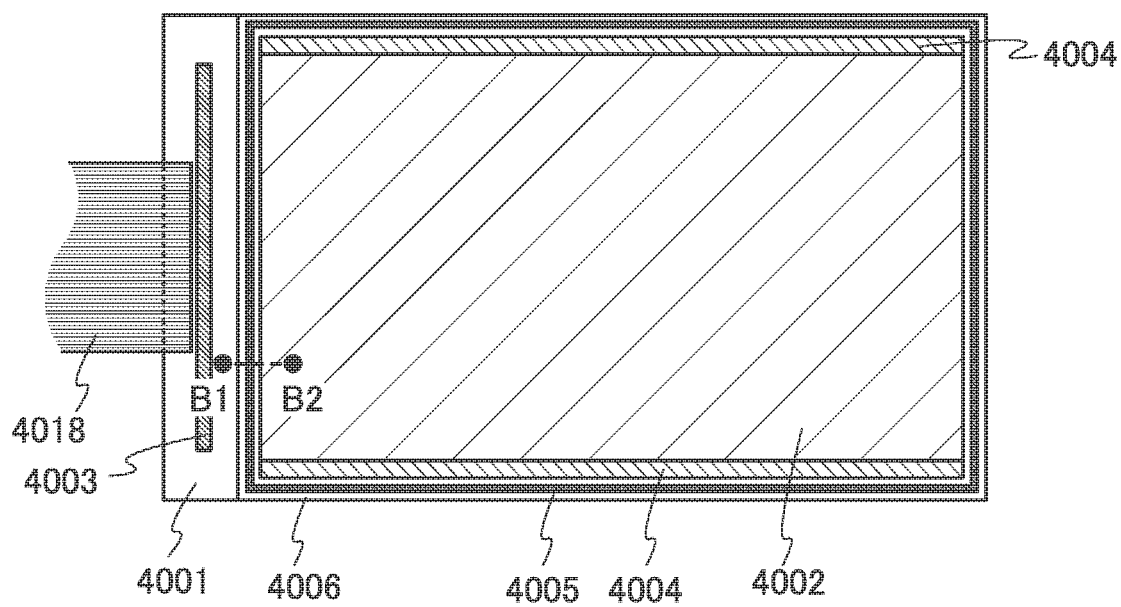
FIG. 12 is a plan view of a liquid crystal display device.
Figure 13:
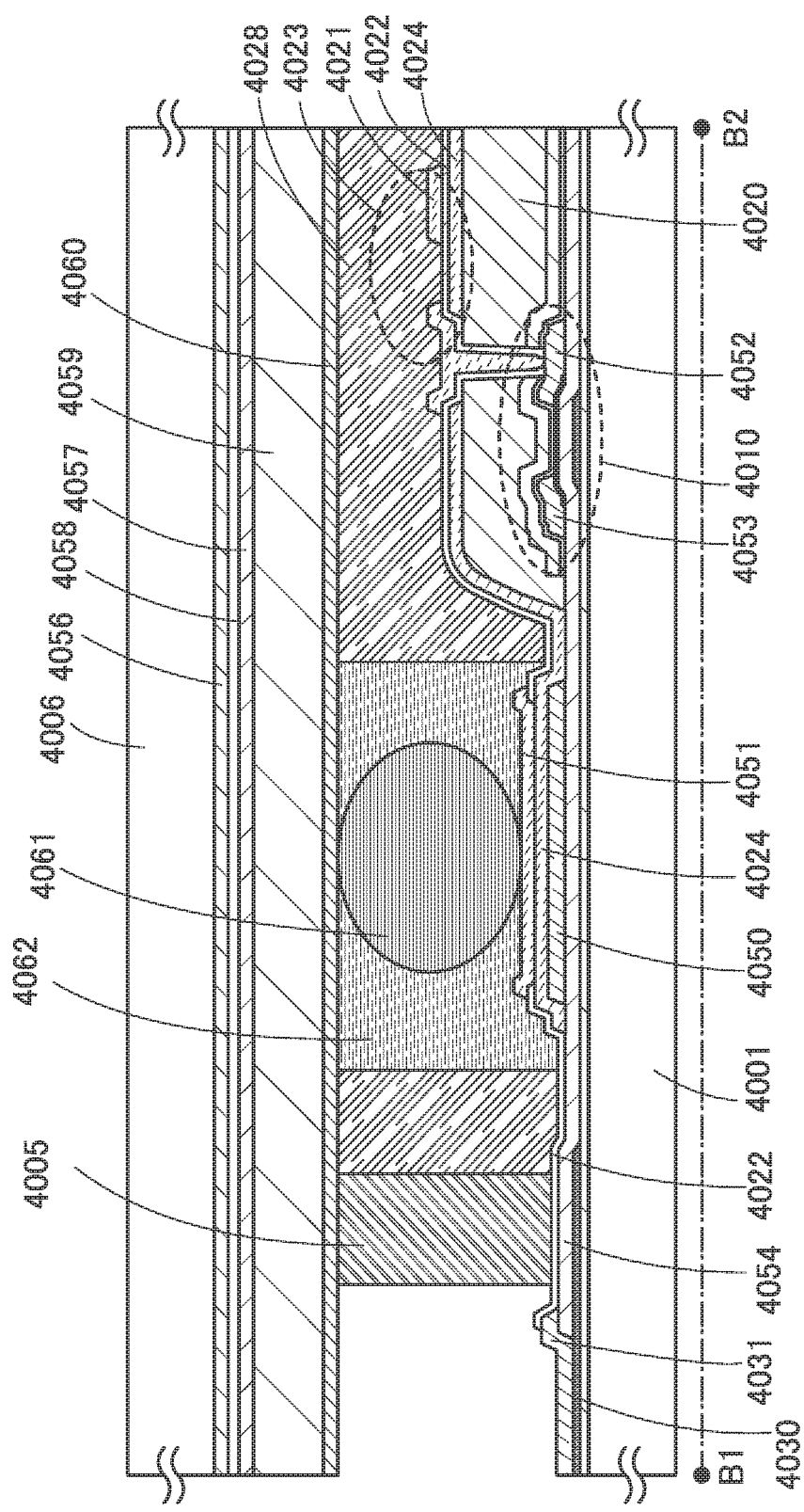
FIG. 13 is a cross-sectional view of a liquid crystal display device.

The appearance of a liquid crystal display device of one embodiment of the present invention will be described with reference to FIG. 12. FIG. 12 is a top view of the liquid crystal display device where a first substrate 4001 and a second substrate 4006 are bonded to each other with a sealant 4005. FIG. 13 corresponds to a cross-sectional view taken along dashed line B1-B2 in FIG. 12. Note that FIG. 12 illustrates an FFS liquid crystal display device.

The sealant 4005 is provided to surround a pixel portion 4002 and a pair of driver circuits 4004 provided over the first substrate 4001. The second substrate 4006 is provided over the pixel portion 4002 and the driver circuits 4004. Thus, the pixel portion 4002 and the driver circuits 4004 are sealed by the first substrate 4001, the sealant 4005, and the second substrate 4006.

A driver circuit 4003 is mounted in a region which is different from the region surrounded by the sealant 4005 over the first substrate 4001.

A plurality of transistors are included in the pixel portion 4002 and the driver circuits 4004 provided over the first substrate 4001. FIG. 13 illustrates a transistor 4010 included in the pixel portion 4002.

In the pixel portion 4002 and the driver circuits 4004, an insulating film 4020 formed using a resin is provided over the transistor 4010. A pixel electrode 4021 of a liquid crystal element 4023, a common electrode 4024, and an insulating film 4022 between the pixel electrode 4021 and the common electrode 4024 are provided over the insulating film 4020.

Although the pixel electrode 4021 is provided over the common electrode 4024 in FIG. 13, the common electrode 4024 may be provided over the pixel electrode 4021.

As illustrated in FIG. 13, in one embodiment of the present invention, the insulating film 4020 is removed at an end of the panel. In the region where the insulating film 4020 is removed, a conductive film 4050 is formed in contact with the common electrode 4024. A conductive film 4051 is provided in contact with the common electrode 4024 at an opening provided in the insulating film 4022.

The conductive film 4050 and conductive films 4052 and 4053 serving as a source and a drain of the transistor 4010 can be formed by etching one conductive film. Furthermore, the pixel electrode 4021 and the conductive film 4051 can be formed by etching one conductive film.

Further, on the second substrate 4006 side, a first electrode 4056 and the second electrode 4057 used for obtaining positional information overlap with each other with an insulating film 4058 interposed therebetween. A resin film 4059 is provided on the first electrode 4056 and the second electrode 4057. Further, a conductive film 4060 is provided on the resin film 4059.

The conductive film 4060 is electrically connected to the conductive film 4051 through a conductive particle 4061 that is dispersed in a resin film 4062. In other words, the common electrode 4024 and the conductive film 4060 are electrically connected to each other through the conductive particle 4061 at the end of the panel. The resin film 4062 can be formed using a thermosetting resin or an ultraviolet curable resin. As the conductive particle 4061, a particle of a spherical organic resin coated with thin-film metal of Au, Ni, Co, or the like can be used, for example.

An alignment film is not illustrated in FIG. 13. In the case of providing alignment films on the insulating film 4022 and the common electrode 4024 and on the conductive film 4060, the alignment film on the conductive film 4060 is partly removed and the alignment film on the insulating film 4022 and the common electrode 4024 is partly removed; thus, electrical connection can be obtained among the conductive film 4060, the conductive particle 4061, and the conductive film 4051.

The insulating film 4022 is in contact with the gate insulating film 4054 at the end of the panel. In the case where the insulating film 4022 and the gate insulating film 4054 each having a high effect of blocking diffusion of water, hydrogen, and the lie, when the insulting film 4022 is in contact with the game insulating film 4054 at the end of the panel, water, hydrogen, and the like can be prevented from entering from the end of the panel or the sealant 4005 into a semiconductor film of the transistor 4010.

A liquid crystal layer 4028 is provided between the first substrate 4001 and the second substrate 4006. The liquid crystal element 4023 includes the pixel electrode 4021, the common electrode 4024, and the liquid crystal layer 4028.

The transmittance of the liquid crystal element 4023 changes when the alignment of liquid crystal molecules included in the liquid crystal layer 4028 changes in accordance with the level of a voltage applied between the pixel electrode 4021 and the common electrode 4024. Accordingly, when the transmittance of the liquid crystal element 4023 is controlled by the potential of an image signal supplied to the pixel electrode 4021, gray-scale images can be displayed.

The liquid crystal display device of one semiconductor of the present invention may display a color image by using a color filter or may display a color image by sequentially turning on a plurality of light sources whose hues are different from each other.

Image signals from the driver circuit 4003 and a variety of control signals and power supply potentials from an FPC 4018 are supplied to the driver circuits 4004 or the pixel portion 4002 through lead wirings 4030 and 4031.

Structural Examples of Electronic Device Using Liquid Crystal Display Device

The liquid crystal display device of one semiconductor of the present invention can be used for display devices, personal computers, or image reproducing devices provided with recording media (typically, devices that reproduce the content of recording media such as digital versatile discs (DVDs) and have displays for displaying the reproduced images). Other examples of the electronic devices to which the liquid crystal display device of one embodiment of the present invention can be applied include cellular phones, game machines (including portable game machines), personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATMs), and vending machines. FIGS. 14A to 14F illustrate specific examples of these electronic devices.

Figure 14A:
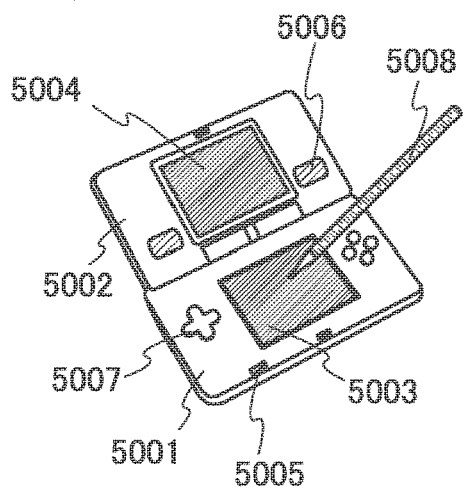
FIGS. 14A to 14F illustrate electronic devices.

FIG. 14A illustrates a portable game machine, which includes a housing 5001, a housing 5002, a display portion 5003, a display portion 5004, a microphone 5005, speakers 5006, an operation key 5007, a stylus 5008, and the like. The liquid crystal display device of one embodiment of the present invention can be used for the display portion 5003 or the display portion 5004. Note that although the portable game machine in FIG. 14A has the two display portions 5003 and 5004, the number of display portions included in the portable game machine is not limited thereto.

Figure 14B:
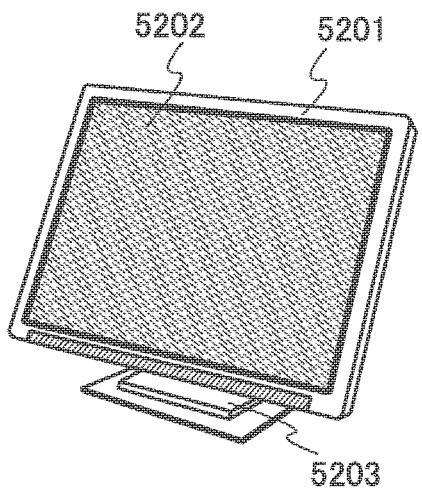

FIG. 14B illustrates a display device, which includes a housing 5201, a display portion 5202, a support 5203, and the like. The liquid crystal display device of one embodiment of the present invention can be used for the display portion 5202. Note that the display device means all display devices for displaying information, such as display devices for personal computers, for receiving TV broadcast, and for displaying advertisements.

Figure 14C:
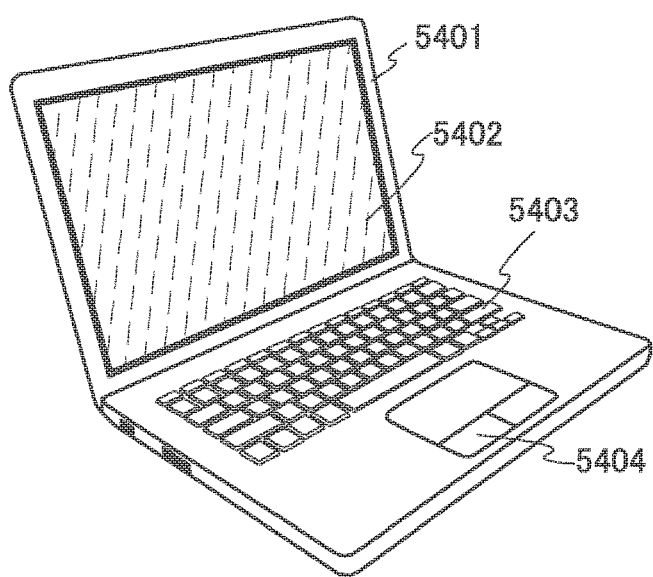

FIG. 14C illustrates a laptop personal computer, which includes a housing 5401, a display portion 5402, a keyboard 5403, a pointing device 5404, and the like. The liquid crystal display device of one of the present invention can be used for the display portion 5402.

Figure 14D:
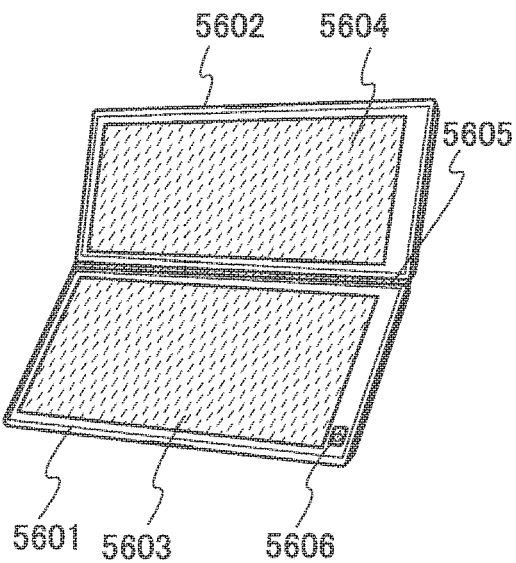

FIG. 14D illustrates a personal digital assistant, which includes a first housing 5601, a second housing 5602, a first display portion 5603, a second display portion 6504, a joint 5605, an operation key 5605, and the like. The first display portion 5603 is provided in the first housing 5601, and the second crystal portion 5604 is provided in the second housing 5602. The first housing 5601 and the second housing 5602 are connected to each other with the joint 5605, and the angle between the first housing 5601 and the second housing 5602 can be changed with the joint 5605. An image on the first crystal portion 5603 may be switched depending on the angle between the first housing 5601 and the second housing 5602 at the joint 5605. The liquid crystal display device of one embodiment of the present invention can be used for the first crystal portion 5603 or the second crystal portion 5604.

Figure 14E:
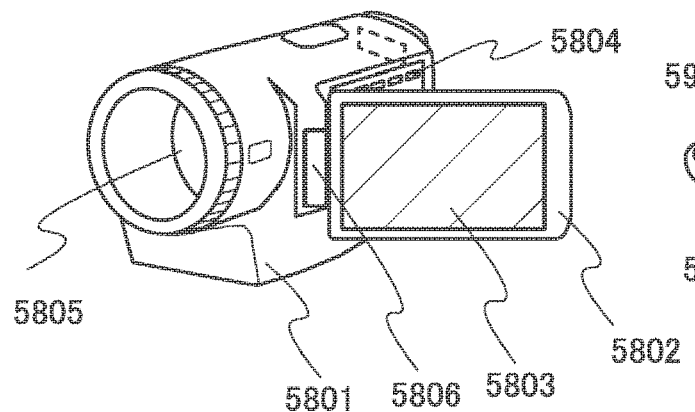

FIG. 14E illustrates a video camera, which includes a first housing 5801, a second housing 5802, a display portion 5803, operation keys 5804, a lens 5805, a joint 5806, and the like. The operation keys 5804 and the lens 5805 are provided in the first housing 5801, and the display portion 5803 is provided in the second housing 5802. The first housing 5801 and the second housing 5802 are connected to each other with the joint 5806, and the angle between the first housing 5801 and the second housing 5802 can be changed with the joint 5806. An image on the display portion 5803 may be switched depending on the angle between the first housing 5801 and the second housing 5802 at the joint 5806. The liquid crystal display device of one embodiment of the present invention can be used for the display portion 5803.

Figure 14F:
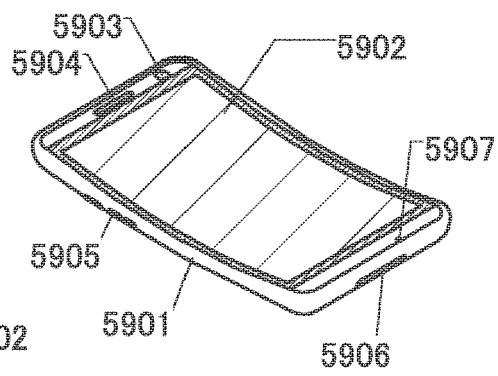

FIG. 14F illustrates a cellular phone. In the cellular phone, a crystal portion 5902, a microphone 5907, a speaker 5904, a camera 5903, an external connection portion 5906, and an operation button 5905 are provided in a housing 5901. The liquid display crystal display device of one embodiment of the present invention can be used for a circuit included in the cellular phone. In the case where the liquid crystal display device of one embodiment of the present invention is formed over a flexible substrate, it can be applied to the display portion 5902 having a curved surface as shown in FIG. 14F.

This application is base don Japanese Patent Application serial No. 2013-059637 filed with Japan Patent Office on Mar. 22, 2013, the entire contents of which are hereby incorporated by reference.

What is claimed is:

1. A liquid crystal display device comprising:
   a transistor over a first substrate;
   a first insulating film over the transistor, the first insulating film including an opening;
   a first electrode over the transistor, the first electrode including an opening;
   a second insulating film over the first electrode, the second insulating film including an opening;
   a second electrode electrically connected to the transistor, the second electrode being over the transistor;
   a liquid crystal layer configured to be applied an electric field by the first electrode and the second electrode;
   a conductive film over the liquid crystal layer;
   a capacitor over the conductive film, the capacitor including a third electrode, a third insulating film, and a fourth electrode, and a capacitance of the capacitor configured to be read; and
   a second substrate over the fourth electrode, the second substrate provided with an alignment film,
   wherein a width of the opening of the first insulating film is larger than a width of the opening of the second insulating film, and
   wherein a channel formation region of the transistor overlap with the opening of the first electrode.

2. The liquid crystal display device according to claim 1, wherein the conductive film comprises at least one of indium oxide containing tungsten oxide, indium zinc oxide containing tungsten oxide, indium oxide containing titanium oxide, indium tin oxide containing titanium oxide, indium tin oxide, indium zinc oxide, zinc oxide, zinc oxide containing gallium, and indium tin oxide containing silicon oxide.

3. The liquid crystal display device according to claim 1, wherein the transistor includes an oxide semiconductor.

4. The liquid crystal display device according to claim 1, wherein the conductive film is electrically connected to the first electrode.

5. The liquid crystal display device according to claim 1, wherein the alignment film is in direct contact with the conductive film.

6. The liquid crystal display device according to claim 1, wherein the liquid crystal display device is a horizontal electric field mode liquid crystal panel.

7. The liquid crystal display device according to claim 1, wherein a positional information of a conductive object close to or in contact with the second substrate is configured to be obtained by a change in the capacitance.

8. The liquid crystal display device according to claim 1, wherein the channel formation region of the transistor does not overlap with the first electrode.

9. A liquid crystal display device comprising:
   a transistor over a first substrate;
   a first insulating film over the transistor, the first insulating film including an opening;
   a first electrode over the transistor, the first electrode including an opening;
   a second insulating film over the first electrode, the second insulating film including an opening;
   a third insulating film over the first electrode;
   a second electrode electrically connected to the transistor, the second electrode being over the transistor;
   a liquid crystal layer configured to be applied an electric field by the first electrode and the second electrode;

a conductive film over the liquid crystal layer;

a capacitor over the conductive film, the capacitor including a third electrode, a fourth insulating film, and a fourth electrode, and a capacitance of the capacitor configured to be read; and a second substrate over the fourth electrode, the second substrate provided with an alignment film, wherein a width of the opening of the first insulating film is larger than a width of the opening of the second insulating film, and wherein a channel formation region of the transistor overlap with the opening of the first electrode.

10. The liquid crystal display device according to claim 9, wherein the conductive film comprises at least one of indium oxide containing tungsten oxide, indium zinc oxide containing tungsten oxide, indium oxide containing titanium oxide, indium tin oxide containing titanium oxide, indium tin oxide, indium zinc oxide, zinc oxide, zinc oxide containing gallium, and indium tin oxide containing silicon oxide.

11. The liquid crystal display device according to claim 9, wherein the transistor includes an oxide semiconductor.

12. The liquid crystal display device according to claim 9, wherein the conductive film is electrically connected to the first electrode.

13. The liquid crystal display device according to claim 9, wherein the alignment film is in direct contact with the conductive film.

14. The liquid crystal display device according to claim 9, wherein the liquid crystal display device is a horizontal electric field mode liquid crystal panel.

15. The liquid crystal display device according to claim 9, wherein a positional information of a conductive object close to or in contact with the second substrate is configured to be obtained by a change in the capacitance.

16. The liquid crystal display device according to claim 9, wherein the channel formation region of the transistor does not overlap with the first electrode.

* * * * *